US012754620B1

(12) United States Patent
Temple et al.

(10) Patent No.: US 12,754,620 B1
(45) Date of Patent: Oct. 6, 2026

(54) DISPLAY OF USER INTERFACES BASED ON MOTION

(71) Applicant: Apple Inc., Cupertino, CA (US)

(72) Inventors: Brian W. Temple, Santa Clara, CA (US); Trent A. Greene, Santa Clara, CA (US); Gregory Lutter, Boulder Creek, CA (US); David Loewenthal, Seattle, WA (US); Ioana Negoita, Mountain View, CA (US); Thomas J. Moore, Northglenn, CO (US); Ian Perry, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 18/886,565

(22) Filed: Sep. 16, 2024

Related U.S. Application Data

(60) Provisional application No. 63/583,570, filed on Sep. 18, 2023.

(51) Int. Cl.
*G06F 3/0346* (2013.01)
*G06T 19/20* (2011.01)

(52) U.S. Cl.
CPC ............ *G06F 3/0346* (2013.01); *G06T 19/20* (2013.01)

(58) Field of Classification Search
CPC .............................. G06F 3/0346; G06T 19/20
See application file for complete search history.

(56) References Cited

U.S. PATENT DOCUMENTS 9,619,105 B1 * 4/2017 Dal Mutto .......... G06F 3/04815
9,696,855 B2 7/2017 Watanabe et al.
9,977,496 B2 5/2018 Maltz
10,353,532 B1 7/2019 Holz et al.
10,607,413 B1 3/2020 Marcolina et al.
10,712,919 B2 7/2020 Lee et al.
(Continued)

FOREIGN PATENT DOCUMENTS

CA 3042535 A1 * 5/2018 ............. A61B 5/486
KR 20230087756 A * 6/2023 ............... G09B 7/02
WO WO-2016105166 A1 * 6/2016 ............. A61B 5/486

OTHER PUBLICATIONS

"App Experience Spartan Trailer", Klocked Fitness [online]. Klocked Fitness, 2022 [retrieved on Dec. 19, 2024]. Retrieved on the Internet: <https://www.klocked.me/>, 12 pages.
(Continued)

*Primary Examiner* — Stephen G Sherman
(74) *Attorney, Agent, or Firm* — Kubota & Basol LLP

(57) ABSTRACT

In some examples, an electronic device detects initiation of an exercise activity associated with a user, and in accordance with a determination that the exercise activity satisfies one or more criteria, the electronic device displays a first user interface element with a first shape based on a first amount of progress of the user toward meeting a first goal associated with the exercise activity. In some examples, while the first user interface element is displayed, the electronic device detects a change in a physical position of the electronic device, and in response, in accordance with a determination that the change in the physical position of the electronic device causes the progress of the user toward meeting the first goal to be a second amount, the electronic device updates display of the first user interface element to be displayed with a second shape that is based on the second amount.

24 Claims, 26 Drawing Sheets

(56) References Cited

U.S. PATENT DOCUMENTS

| | | | | |
|---|---|---|---|---|
| 10,838,490 | B2 | 11/2020 | Pace et al. | |
| 11,145,126 | B1 | 10/2021 | Bramwell et al. | |
| 11,150,777 | B2 | 10/2021 | Kaehler et al. | |
| 11,170,521 | B1 | 11/2021 | Ben Himane et al. | |
| 11,278,810 | B1 | 3/2022 | Sarria et al. | |
| 11,335,066 | B2 | 5/2022 | Ha et al. | |
| 11,811,876 | B2 | 11/2023 | Berliner et al. | |
| 11,853,533 | B1 | 12/2023 | Chor et al. | |
| 11,948,263 | B1 | 4/2024 | Rudman et al. | |
| 12,094,070 | B2 | 9/2024 | Terre et al. | |
| 12,190,579 | B2 | 1/2025 | Gotoh et al. | |
| 12,353,627 | B2 | 7/2025 | Choi et al. | |
| 2007/0035563 | A1 | 2/2007 | Biocca et al. | |
| 2012/0075168 | A1 | 3/2012 | Osterhout et al. | |
| 2012/0306768 | A1 | 12/2012 | Bailey | |
| 2013/0335573 | A1 * | 12/2013 | Forutanpour | G06F 3/011 345/173 |
| 2015/0309264 | A1 | 10/2015 | Abovitz et al. | |
| 2016/0026253 | A1 | 1/2016 | Bradski et al. | |
| 2016/0257000 | A1 | 9/2016 | Guerin et al. | |
| 2017/0343811 | A1 | 11/2017 | Mese et al. | |
| 2018/0021629 | A1 | 1/2018 | Deluca et al. | |
| 2018/0046363 | A1 | 2/2018 | Miller et al. | |
| 2018/0053337 | A1 | 2/2018 | Nakashima et al. | |
| 2018/0095636 | A1 | 4/2018 | Valdivia et al. | |
| 2018/0157398 | A1 | 6/2018 | Kaehler et al. | |
| 2018/0173323 | A1 | 6/2018 | Harvey et al. | |
| 2018/0189354 | A1 | 7/2018 | Paine et al. | |
| 2018/0239144 | A1 | 8/2018 | Woods et al. | |
| 2018/0300897 | A1 | 10/2018 | Woods et al. | |
| 2018/0350150 | A1 | 12/2018 | Powderly et al. | |
| 2019/0004618 | A1 | 1/2019 | Tadros et al. | |
| 2019/0026936 | A1 | 1/2019 | Gorur Sheshagiri et al. | |
| 2019/0065027 | A1 | 2/2019 | Hauenstein et al. | |
| 2019/0108578 | A1 | 4/2019 | Spivack et al. | |
| 2019/0311539 | A1 | 10/2019 | Hogue | |
| 2019/0340649 | A1 | 11/2019 | Ayush et al. | |
| 2019/0366154 | A1 | 12/2019 | Callaghan | |
| 2019/0371279 | A1 | 12/2019 | Mak | |
| 2019/0378204 | A1 | 12/2019 | Ayush et al. | |
| 2020/0035012 | A1 | 1/2020 | Mullins et al. | |
| 2020/0357300 | A1 | 11/2020 | Galasso et al. | |
| 2020/0410766 | A1 | 12/2020 | Swaminathan | |
| 2021/0096726 | A1 | 4/2021 | Faulkner et al. | |
| 2021/0097776 | A1 | 4/2021 | Faulkner et al. | |
| 2021/0168270 | A1 | 6/2021 | Browne | |
| 2021/0192847 | A1 | 6/2021 | Nagaraja | |
| 2022/0027115 | A1 | 1/2022 | Haapoja et al. | |
| 2022/0072381 | A1 | 3/2022 | Trehan | |
| 2022/0101593 | A1 | 3/2022 | Rockel et al. | |
| 2022/0129066 | A1 | 4/2022 | Zahnert et al. | |
| 2023/0145066 | A1 * | 5/2023 | Jeong | G01C 21/3697 705/324 |
| 2023/0256297 | A1 | 8/2023 | Canberk et al. | |
| 2023/0396752 | A1 | 12/2023 | Jansen Dos Reis | |
| 2023/0403460 | A1 | 12/2023 | Bethurum et al. | |
| 2024/0061547 | A1 | 2/2024 | Fleizach et al. | |
| 2024/0087256 | A1 | 3/2024 | Hylak et al. | |
| 2024/0144619 | A1 | 5/2024 | Heitger | |
| 2024/0193892 | A1 | 6/2024 | Lutter et al. | |
| 2024/0338909 | A1 | 10/2024 | Miller et al. | |
| 2025/0076970 | A1 | 3/2025 | Omata et al. | |
| 2025/0090934 | A1 | 3/2025 | Negoita et al. | |
| 2025/0094016 | A1 | 3/2025 | Negoita et al. | |

OTHER PUBLICATIONS

Matsuda, Keiichi, "HYPER-REALITY" [online]. HYPER-REALITY, 2016 [retrieved on Dec. 19, 2024]. Retrieved on the Internet: <http://hyper-reality.co/>, 20 pages.

Budhiraja, et al., "Interaction Techniques for HMD-HHD Hybrid AR Systems", IEEE International Symposium on Mixed and Augmented Reality, Science and Technology Proceedings, Oct. 1-4, 2013, 2013, pp. 243-244.

Dirks, Brent, "What Is Action Mode on iPhone 14 and iPhone 14 Pro?", (See Walking Test video at 1:17), Retrieved on the internet: <https://www.makeuseof.com/what-is-action-mode-iphone-14-pro/>, [retrieved on: Jan. 29, 2025], Oct. 15, 2022, 6 pages.

Non-Final Office Action received for U.S. Appl. No. 18/824,823, mailed on Oct. 1, 2025, 36 pages.

Non-Final Office Action received for U.S. Appl. No. 18/823,550, mailed on Feb. 12, 2026, 15 pages.

Notice of Allowance received for U.S. Appl. No. 18/824,823, mailed on Feb. 23, 2026, 6 pages.

* cited by examiner

600

DISPLAY OF USER INTERFACES BASED ON MOTION

CROSS-REFERENCE TO RELATED APPLICATIONS

This application claims the benefit of U.S. Provisional Application No. 63/583,570, filed Sep. 18, 2023, the content of which is herein incorporated by reference in its entirety for all purposes.

FIELD OF THE DISCLOSURE

This relates generally to systems and methods for displaying user interfaces including content based on motion of an electronic device in a computer-generated environment.

BACKGROUND OF THE DISCLOSURE

Some computer graphical environments provide two-dimensional and/or three-dimensional environments where at least some objects displayed for a user's viewing are virtual and generated by a computer. In some examples, an electronic device displays a virtual user interface in a computer-generated environment that is associated with a detected activity of a user of the electronic device. In some examples, the activity of the user of the electronic device includes movement of the user, and thereby, movement of the electronic device. Thus, there is a need for systems and methods for displaying one or more user interfaces at an electronic device based on the movement of the electronic device to help reduce and/or avoid user distraction and/or user discomfort (e.g., via eye strain).

SUMMARY OF THE DISCLOSURE

Some examples of the disclosure are directed to systems and methods for displaying user interfaces in a computer-generated environment based on motion of a user of the electronic device. In some examples, an electronic device in communication with a display and one or more input devices detects, via the one or more input devices, initiation of an exercise activity associated with a user of the electronic device. In some examples, in response to detecting the initiation of the exercise activity, the electronic device activates an exercise tracking mode of operation. In some examples, while the exercise tracking mode of operation is active, in accordance with a determination that the exercise activity satisfies one or more criteria, the electronic device displays, via the display, a first user interface element with one or more first visual characteristics including a first shape in a computer-generated environment relative to a viewpoint of the electronic device, wherein the first shape is based on a first amount of progress of the user toward meeting a first goal associated with the exercise activity. In some examples, while the first user interface element is displayed, the electronic device detects, via the one or more input devices, a change in a physical position of the electronic device. In some examples, in response to detecting the change in the physical position of the electronic device, in accordance with a determination that the change in the physical position of the electronic device causes the progress of the user toward meeting the first goal to be a second amount, different from the first amount, the electronic device updates display, via the display, of the first user interface element to be displayed with one or more second visual characteristics, different from the one or more first visual characteristics, in the computer-generated environment relative to the viewpoint of the electronic device, wherein the one or more second visual characteristics include a second shape that is based on the second amount.

In some examples, an electronic device in communication with a display and one or more input devices detects, via the one or more input devices, a first movement of the electronic device that includes a change in a physical position of the electronic device. In some examples, in response to detecting the first movement of the electronic device, the electronic device displays, via the display, a first user interface element at a first location in a computer-generated environment relative to a viewpoint of the electronic device, wherein the first location is selected in accordance with a direction of the first movement of the electronic device. In some examples, while displaying the first user interface element in the computer-generated environment, the electronic device determines second movement of the electronic device. In some examples, in response to determining the second movement of the electronic device, the electronic device updates the first user interface element to be displayed at a second location, different from the first location, relative to the viewpoint of the electronic device, wherein the second location is selected in accordance with a direction of the second movement of the electronic device.

The full descriptions of these examples are provided in the Drawings and the Detailed Description, and it is understood that this Summary does not limit the scope of the disclosure in any way.

BRIEF DESCRIPTION OF THE DRAWINGS

For improved understanding of the various examples described herein, reference should be made to the Detailed Description below along with the following drawings. Like reference numerals often refer to corresponding parts throughout the drawings.

DETAILED DESCRIPTION

Figure 1:
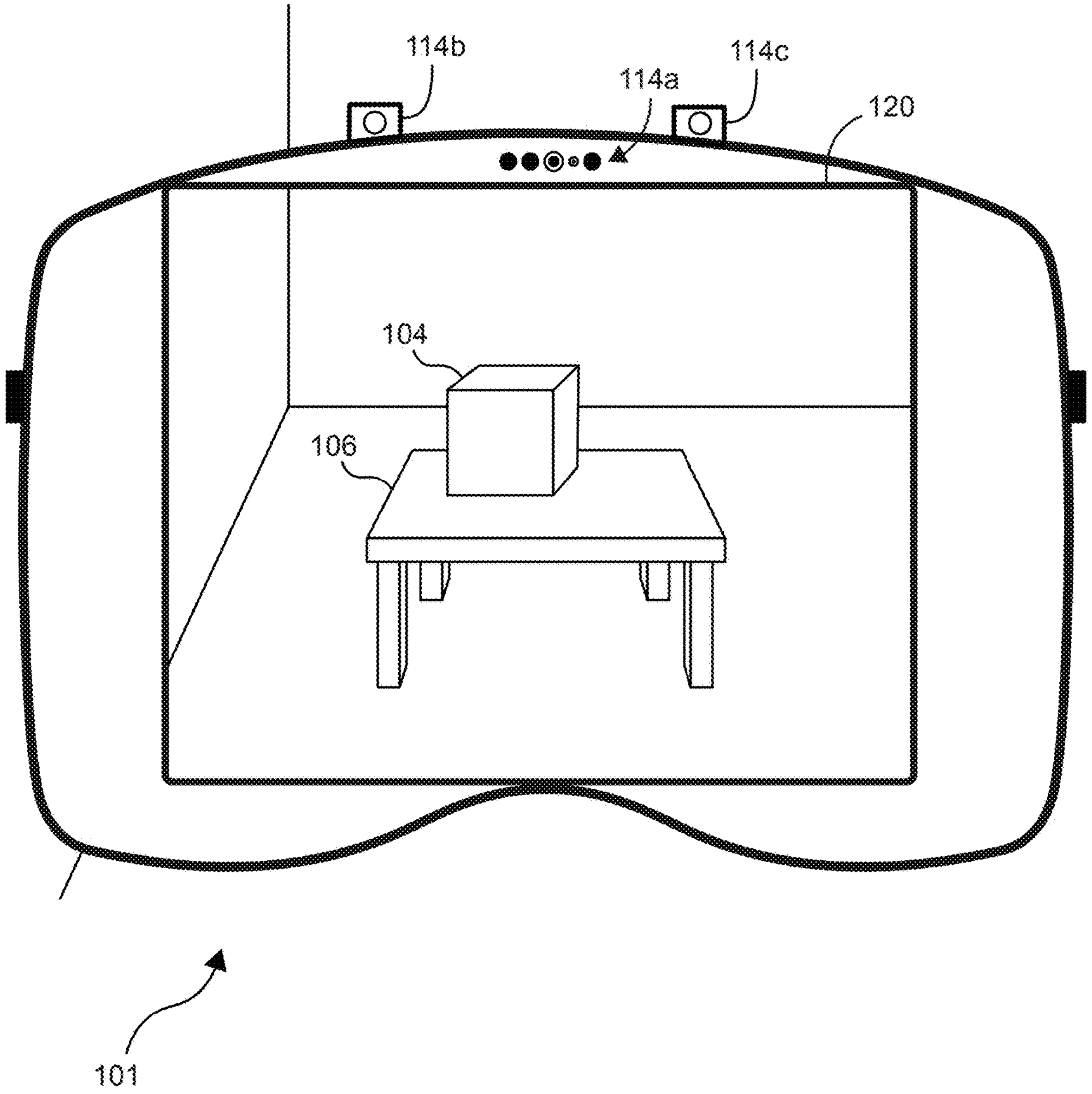
FIG. 1 illustrates an electronic device presenting an extended reality environment according to some examples of the disclosure.

Some examples of the disclosure are directed to systems and methods for displaying user interfaces in a computer-generated environment based on motion of a user of the electronic device. In some examples, an electronic device in communication with a display and one or more input devices detects, via the one or more input devices, initiation of an exercise activity associated with a user of the electronic device. In some examples, in response to detecting the initiation of the exercise activity, the electronic device activates an exercise tracking mode of operation. In some examples, while the exercise tracking mode of operation is active, in accordance with a determination that the exercise activity satisfies one or more criteria, the electronic device displays, via the display, a first user interface element with one or more first visual characteristics including a first shape in a computer-generated environment relative to a viewpoint of the electronic device, wherein the first shape is based on a first amount of progress of the user toward meeting a first goal associated with the exercise activity. In some examples, while the first user interface element is displayed, the electronic device detects, via the one or more input devices, a change in a physical position of the electronic device. In some examples, in response to detecting the change in the physical position of the electronic device, in accordance with a determination that the change in the physical position of the electronic device causes the progress of the user toward meeting the first goal to be a second amount, different from the first amount, the electronic device updates display, via the display, of the first user interface element to be displayed with one or more second visual characteristics, different from the one or more first visual characteristics, in the computer-generated environment relative to the viewpoint of the electronic device, wherein the one or more second visual characteristics include a second shape that is based on the second amount.

In some examples, an electronic device in communication with a display and one or more input devices detects, via the one or more input devices, a first movement of the electronic device that includes a change in a physical position of the electronic device. In some examples, in response to detecting the first movement of the electronic device, the electronic device displays, via the display, a first user interface element at a first location in a computer-generated environment relative to a viewpoint of the electronic device, wherein the first location is selected in accordance with a direction of the first movement of the electronic device. In some examples, while displaying the first user interface element in the computer-generated environment, the electronic device determines second movement of the electronic device. In some examples, in response to determining the second movement of the electronic device, the electronic device updates the first user interface element to be displayed at a second location, different from the first location, relative to the viewpoint of the electronic device, wherein the second location is selected in accordance with a direction of the second movement of the electronic device.

In some examples, a three-dimensional object is displayed in a computer-generated three-dimensional environment with a particular orientation that controls one or more behaviors of the three-dimensional object (e.g., when the three-dimensional object is moved within the three-dimensional environment). In some examples, the orientation in which the three-dimensional object is displayed in the three-dimensional environment is selected by a user of the electronic device or automatically selected by the electronic device. For example, when initiating presentation of the three-dimensional object in the three-dimensional environment, the user may select a particular orientation for the three-dimensional object or the electronic device may automatically select the orientation for the three-dimensional object (e.g., based on a type of the three-dimensional object).

In some examples, a three-dimensional object can be displayed in the three-dimensional environment in a world-locked orientation, a body-locked orientation, a tilt-locked orientation, or a head-locked orientation, as described below. As used herein, an object that is displayed in a body-locked orientation in a three-dimensional environment has a distance and orientation offset relative to a portion of the user's body (e.g., the user's torso). Alternatively, in some examples, a body-locked object has a fixed distance from the user without the orientation of the content being referenced to any portion of the user's body (e.g., may be displayed in the same cardinal direction relative to the user, regardless of head and/or body movement). Additionally or alternatively, in some examples, the body-locked object may be configured to always remain gravity or horizon (e.g., normal to gravity) aligned, such that head and/or body changes in the roll direction would not cause the body-locked object to move within the three-dimensional environment. Rather, translational movement in either configuration would cause the body-locked object to be repositioned within the three-dimensional environment to maintain the distance offset.

As used herein, an object that is displayed in a head-locked orientation in a three-dimensional environment has a distance and orientation offset relative to the user's head. In some examples, a head-locked object moves within the three-dimensional environment as the user's head moves (as the viewpoint of the user changes).

As used herein, an object that is displayed in a world-locked orientation in a three-dimensional environment does not have a distance or orientation offset relative to the user.

FIG. 1 illustrates an electronic device 101 presenting an extended reality (XR) environment (e.g., a computer-generated environment optionally including representations of physical and/or virtual objects) according to some examples of the disclosure. In some examples, as shown in FIG. 1, electronic device 101 is a head-mounted display or other head-mountable device configured to be worn on a head of a user of the electronic device 101. Examples of electronic device 101 are described below with reference to the architecture block diagrams of FIG. 2. As shown in FIG. 1, electronic device 101 and table 106 are located in a physical environment. The physical environment may include physical features such as a physical surface (e.g., floor, walls) or a physical object (e.g., table, lamp, etc.). In some examples, electronic device 101 may be configured to detect and/or capture images of physical environment including table 106 (illustrated in the field of view of electronic device 101).

In some examples, as shown in FIG. 1, electronic device 101 includes one or more internal image sensors **114*a* oriented towards a face of the user (e.g., eye tracking cameras described below with reference to FIG. 2). In some examples, internal image sensors 114*a* are used for eye tracking (e.g., detecting a gaze of the user). Internal image sensors 114*a* are optionally arranged on the left and right portions of display 120 to enable eye tracking of the user's left and right eyes. In some examples, electronic device 101 also includes external image sensors 114*b* and 114*c* facing outwards from the user to detect and/or capture the physical environment of the electronic device 101** and/or movements of the user's hands or other body parts.

In some examples, display 120 has a field of view visible to the user (e.g., that may or may not correspond to a field of view of external image sensors **114*b* and 114*c*). Because display 120 is optionally part of a head-mounted device, the field of view of display 120 is optionally the same as or similar to the field of view of the user's eyes. In other examples, the field of view of display 120 may be smaller than the field of view of the user's eyes. In some examples, electronic device 101 may be an optical see-through device in which display 120 is a transparent or translucent display through which portions of the physical environment may be directly viewed. In some examples, display 120 may be included within a transparent lens and may overlap all or only a portion of the transparent lens. In other examples, electronic device may be a video-passthrough device in which display 120 is an opaque display configured to display images of the physical environment captured by external image sensors 114***b* and 114*c*. While a single display 120 is shown, it should be appreciated that display 120 may include a stereo pair of displays.

In some examples, in response to a trigger, the electronic device 101 may be configured to display a virtual object 104 in the XR environment represented by a cube illustrated in FIG. 1, which is not present in the physical environment, but is displayed in the XR environment positioned on the top of real-world table 106 (or a representation thereof). Optionally, virtual object 104 can be displayed on the surface of the table 106 in the XR environment displayed via the display 120 of the electronic device 101 in response to detecting the planar surface of table 106 in the physical environment 100.

It should be understood that virtual object 104 is a representative virtual object and one or more different virtual objects (e.g., of various dimensionality such as two-dimensional or other three-dimensional virtual objects) can be included and rendered in a three-dimensional XR environment. For example, the virtual object can represent an application or a user interface displayed in the XR environment. In some examples, the virtual object can represent content corresponding to the application and/or displayed via the user interface in the XR environment. In some examples, the virtual object 104 is optionally configured to be interactive and responsive to user input (e.g., air gestures, such as air pinch gestures, air tap gestures, and/or air touch gestures), such that a user may virtually touch, tap, move, rotate, or otherwise interact with, the virtual object 104.

In some examples, displaying an object in a three-dimensional environment may include interaction with one or more user interface objects in the three-dimensional environment. For example, initiation of display of the object in the three-dimensional environment can include interaction with one or more virtual options/affordances displayed in the three-dimensional environment. In some examples, a user's gaze may be tracked by the electronic device as an input for identifying one or more virtual options/affordances targeted for selection when initiating display of an object in the three-dimensional environment. For example, gaze can be used to identify one or more virtual options/affordances targeted for selection using another selection input. In some examples, a virtual option/affordance may be selected using hand-tracking input detected via an input device in communication with the electronic device. In some examples, objects displayed in the three-dimensional environment may be moved and/or reoriented in the three-dimensional environment in accordance with movement input detected via the input device.

In the discussion that follows, an electronic device that is in communication with a display generation component and one or more input devices is described. It should be understood that the electronic device optionally is in communication with one or more other physical user-interface devices, such as a touch-sensitive surface, a physical keyboard, a mouse, a joystick, a hand tracking device, an eye tracking device, a stylus, etc. Further, as described above, it should be understood that the described electronic device, display and touch-sensitive surface are optionally distributed amongst two or more devices. Therefore, as used in this disclosure, information displayed on the electronic device or by the electronic device is optionally used to describe information outputted by the electronic device for display on a separate display device (touch-sensitive or not). Similarly, as used in this disclosure, input received on the electronic device (e.g., touch input received on a touch-sensitive surface of the electronic device, or touch input received on the surface of a stylus) is optionally used to describe input received on a separate input device, from which the electronic device receives input information.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, a television channel browsing application, and/or a digital video player application.

Figure 2:
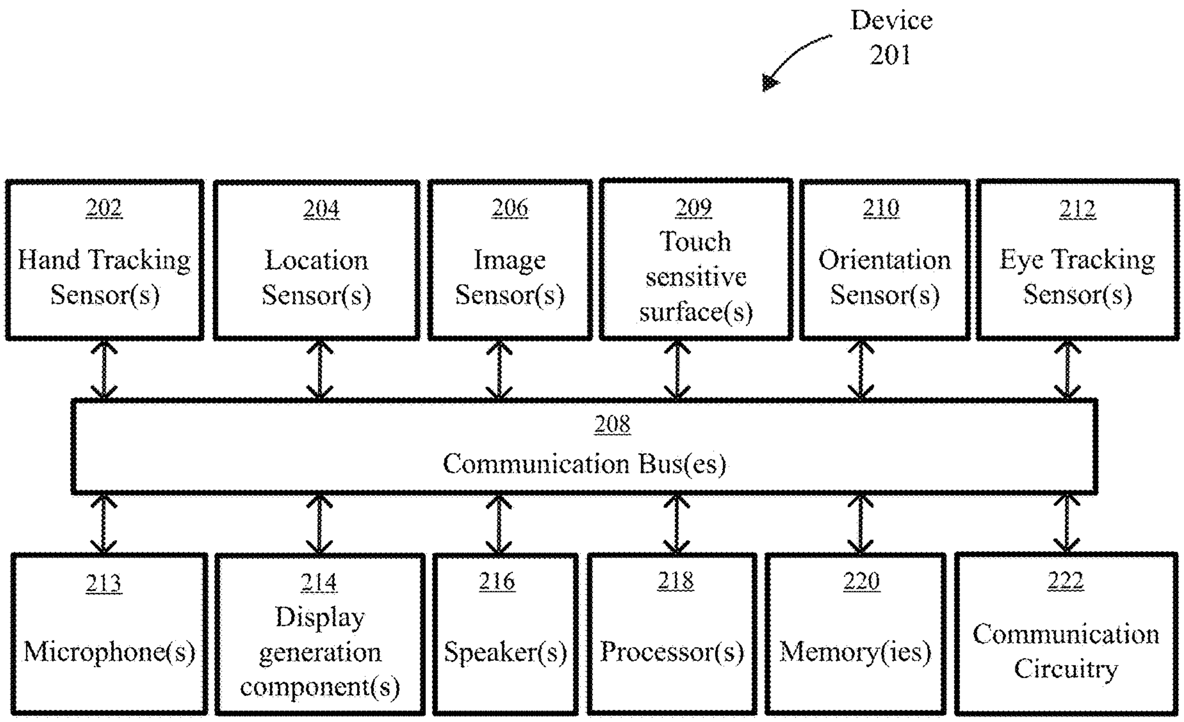
FIG. 2 illustrates a block diagram of an example architecture for a device according to some examples of the disclosure.

FIG. 2 illustrates a block diagram of an example architecture for a device 201 according to some examples of the disclosure. In some examples, device 201 includes one or more electronic devices. For example, the electronic device 201 may be a portable device, an auxiliary device in communication with another device, a head-mounted display, etc., respectively. In some examples, electronic device 201 corresponds to electronic device 101 described above with reference to FIG. 1.

As illustrated in FIG. 2, the electronic device 201 optionally includes various sensors, such as one or more hand tracking sensors 202, one or more location sensors 204, one or more image sensors 206 (optionally corresponding to internal image sensors 114*a* and/or external image sensors 114*b* and 114*c* in FIG. 1), one or more touch-sensitive surfaces 209, one or more motion and/or orientation sensors 210, one or more eye tracking sensors 212, one or more microphones 213 or other audio sensors, one or more body tracking sensors (e.g., torso and/or head tracking sensors), one or more display generation components 214, optionally corresponding to display 120 in FIG. 1, one or more speakers 216, one or more processors 218, one or more memories 220, and/or communication circuitry 222. One or more communication buses 208 are optionally used for communication between the above-mentioned components of electronic devices 201.

Communication circuitry 222 optionally includes circuitry for communicating with electronic devices, networks, such as the Internet, intranets, a wired network and/or a wireless network, cellular networks, and wireless local area networks (LANs). Communication circuitry 222 optionally includes circuitry for communicating using near-field communication (NFC) and/or short-range communication, such as Bluetooth®.

Processor(s) 218 include one or more general processors, one or more graphics processors, and/or one or more digital signal processors. In some examples, memory 220 is a non-transitory computer-readable storage medium (e.g., flash memory, random access memory, or other volatile or non-volatile memory or storage) that stores computer-readable instructions configured to be executed by processor(s) 218 to perform the techniques, processes, and/or methods described below. In some examples, memory 220 can include more than one non-transitory computer-readable storage medium. A non-transitory computer-readable storage medium can be any medium (e.g., excluding a signal) that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on compact disc (CD), digital versatile disc (DVD), or Blu-ray technologies, as well as persistent solid-state memory such as flash, solid-state drives, and the like.

In some examples, display generation component(s) 214 include a single display (e.g., a liquid-crystal display (LCD), organic light-emitting diode (OLED), or other types of display). In some examples, display generation component(s) 214 includes multiple displays. In some examples, display generation component(s) 214 can include a display with touch capability (e.g., a touch screen), a projector, a holographic projector, a retinal projector, a transparent or translucent display, etc. In some examples, electronic device 201 includes touch-sensitive surface(s) 209, respectively, for receiving user inputs, such as tap inputs and swipe inputs or other gestures. In some examples, display generation component(s) 214 and touch-sensitive surface(s) 209 form touch-sensitive display(s) (e.g., a touch screen integrated with electronic device 201 or external to electronic device 201 that is in communication with electronic device 201).

Electronic device 201 optionally includes image sensor(s) 206. Image sensors(s) 206 optionally include one or more visible light image sensors, such as charged coupled device (CCD) sensors, and/or complementary metal-oxide-semiconductor (CMOS) sensors operable to obtain images of physical objects from the real-world environment. Image sensor(s) 206 also optionally include one or more infrared (IR) sensors, such as a passive or an active IR sensor, for detecting infrared light from the real-world environment. For example, an active IR sensor includes an IR emitter for emitting infrared light into the real-world environment. Image sensor(s) 206 also optionally include one or more cameras configured to capture movement of physical objects in the real-world environment. Image sensor(s) 206 also optionally include one or more depth sensors configured to detect the distance of physical objects from electronic device 201. In some examples, information from one or more depth sensors can allow the device to identify and differentiate objects in the real-world environment from other objects in the real-world environment. In some examples, one or more depth sensors can allow the device to determine the texture and/or topography of objects in the real-world environment.

In some examples, electronic device 201 uses CCD sensors, event cameras, and depth sensors in combination to detect the physical environment around electronic device 201. In some examples, image sensor(s) 206 include a first image sensor and a second image sensor. The first image sensor and the second image sensor work in tandem and are optionally configured to capture different information of physical objects in the real-world environment. In some examples, the first image sensor is a visible light image sensor and the second image sensor is a depth sensor. In some examples, electronic device 201 uses image sensor(s) 206 to detect the position and orientation of electronic device 201 and/or display generation component(s) 214 in the real-world environment. For example, electronic device 201 uses image sensor(s) 206 to track the position and orientation of display generation component(s) 214 relative to one or more fixed objects in the real-world environment.

In some examples, electronic device 201 includes microphone(s) 213 or other audio sensors. Electronic device 201 optionally uses microphone(s) 213 to detect sound from the user and/or the real-world environment of the user. In some examples, microphone(s) 213 includes an array of microphones (a plurality of microphones) that optionally operate in tandem, such as to identify ambient noise or to locate the source of sound in space of the real-world environment.

Electronic device 201 includes location sensor(s) 204 for detecting a location of electronic device 201 and/or display generation component(s) 214. For example, location sensor(s) 204 can include a global position system (GPS) receiver that receives data from one or more satellites and allows electronic device 201 to determine the device's absolute position in the physical world.

Electronic device 201 includes orientation sensor(s) 210 for detecting orientation and/or movement of electronic device 201 and/or display generation component(s) 214. For example, electronic device 201 uses orientation sensor(s) 210 to track changes in the position and/or orientation of electronic device 201 and/or display generation component(s) 214, such as with respect to physical objects in the real-world environment. Orientation sensor(s) 210 optionally include one or more gyroscopes and/or one or more accelerometers.

Electronic device 201 includes hand tracking sensor(s) 202 and/or eye tracking sensor(s) 212 (and/or other body tracking sensor(s), such as leg, torso and/or head tracking sensor(s)), in some examples. Hand tracking sensor(s) 202 are configured to track the position/location of one or more portions of the user's hands, and/or motions of one or more portions of the user's hands with respect to the extended reality environment, relative to the display generation component(s) 214, and/or relative to another defined coordinate system. Eye tracking sensor(s) 212 are configured to track the position and movement of a user's gaze (eyes, face, or head, more generally) with respect to the real-world or extended reality environment and/or relative to the display generation component(s) 214. In some examples, hand tracking sensor(s) 202 and/or eye tracking sensor(s) 212 are implemented together with the display generation component(s) 214. In some examples, the hand tracking sensor(s) 202 and/or eye tracking sensor(s) 212 are implemented separate from the display generation component(s) 214.

In some examples, the hand tracking sensor(s) 202 (and/or other body tracking sensor(s), such as leg, torso and/or head tracking sensor(s)) can use image sensor(s) 206 (e.g., one or more IR cameras, 3D cameras, depth cameras, etc.) that capture three-dimensional information from the real-world including one or more body parts (e.g., hands, legs, or torso of a human user). In some examples, the hands can be resolved with sufficient resolution to distinguish fingers and their respective positions. In some examples, one or more image sensors 206 are positioned relative to the user to define a field of view of the image sensor(s) 206 and an interaction space in which finger/hand position, orientation and/or movement captured by the image sensors are used as inputs (e.g., to distinguish from a user's resting hand or other hands of other persons in the real-world environment).

Tracking the fingers/hands for input (e.g., gestures, touch, tap, etc.) can be advantageous in that it does not require the user to touch, hold or wear any sort of beacon, sensor, or other marker.

In some examples, eye tracking sensor(s) 212 includes at least one eye tracking camera (e.g., infrared (IR) cameras) and/or illumination sources (e.g., IR light sources, such as LEDs) that emit light towards a user's eyes. The eye tracking cameras may be pointed towards a user's eyes to receive reflected IR light from the light sources directly or indirectly from the eyes. In some examples, both eyes are tracked separately by respective eye tracking cameras and illumination sources, and a focus/gaze can be determined from tracking both eyes. In some examples, one eye (e.g., a dominant eye) is tracked by one or more respective eye tracking cameras/illumination sources.

Electronic device 201 is not limited to the components and configuration of FIG. 2, but can include fewer, other, or additional components in multiple configurations. In some examples, electronic device 201 can be implemented between two electronic devices (e.g., as a system). In some such examples, each of (or more) electronic device may each include one or more of the same components discussed above, such as various sensors, one or more display generation components, one or more speakers, one or more processors, one or more memories, and/or communication circuitry. A person or persons using electronic device 201, is optionally referred to herein as a user or users of the device.

Attention is now directed towards examples of display of one or more user interfaces associated with a detected user activity within a computer-generated environment at an electronic device based on a progress of the activity toward meeting one or more goals associated with the activity.

FIGS. 3A-3L illustrate examples of an electronic device displaying one or more user interfaces associated with one or more goals of an exercise activity in a computer-generated environment according to some examples of the disclosure. The electronic device 301 may be similar to device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In the example of FIGS. 3A-3L, a user is optionally wearing the electronic device 301, such that three-dimensional environment 350 (e.g., a computer-generated environment) can be defined by X, Y and Z axes as viewed from a perspective of the electronic device (e.g., a viewpoint associated with the user of the electronic device 301). Accordingly, as used herein, the electronic device 301 is configured to be movable with six degrees of freedom based on the movement of the user (e.g., the head of the user), such that the electronic device 301 may be moved in the roll direction, the pitch direction, and/or the yaw direction.

Figure 3A:
FIGS. 3A-3L illustrate examples of an electronic device displaying one or more user interfaces associated with one or more goals of an exercise activity in a computer-generated environment according to some examples of the disclosure.

As shown in FIG. 3A, the electronic device 301 may be positioned in a physical environment (e.g., an outdoors environment) that includes a plurality of real-world objects. For example, in FIG. 3A, the electronic device 301 may be positioned in a city environment or a physical environment 340 that includes a plurality of buildings, sidewalks, roads, greenery (e.g., flowers, grass, shrubbery, trees, plants, etc.), streetlamps, streetlights, and the like (e.g., the user of the electronic device 301 is standing or walking on a sidewalk in the physical city environment). Accordingly, in some examples, the three-dimensional environment 350 presented using the electronic device 301 optionally includes captured portions of the physical environment (e.g., the city environment 340) surrounding the electronic device 301, such as one or more representations of one or more buildings in the field of view of the three-dimensional environment 350. Additionally, as shown in FIG. 3A, the three-dimensional environment 350 may include representations of the sidewalks, roads, greenery, streetlamps, and/or streetlights of the city environment 340 in which the electronic device 301 is located. In some examples, the representations can include portions of the physical environment viewed through a transparent or translucent display of electronic device 301.

Figure 3B:
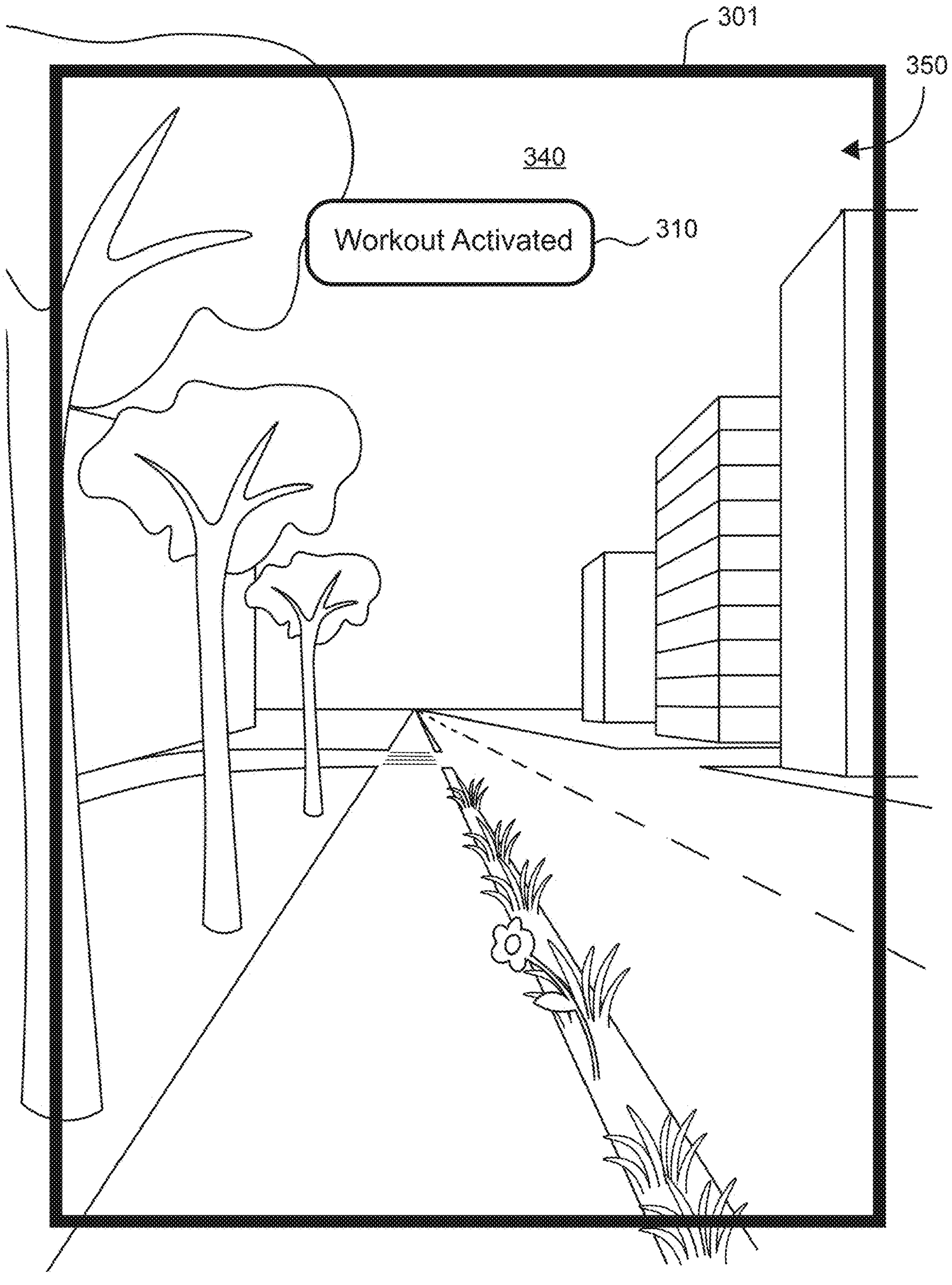

In FIG. 3B, the electronic device 301 detects initiation of an exercise activity associated with the user of the electronic device 301. For example, from FIGS. 3A to 3B, the electronic device 301 detects, via one or more sensors (e.g., such as the sensor(s) described with reference to FIG. 2), movement of the electronic device 301 within the physical environment 340 caused by movement of the user of the electronic device 301. In some examples, the exercise activity corresponds to a walking activity, a running activity, a cycling activity, a lunging activity, among other possibilities, which produces movement of the electronic device 301 in the city environment 340. In some examples, detecting initiation of the exercise activity includes detecting user input via an exercise application operating on the electronic device 301. For example, the electronic device 301 detects user input for recording the exercise activity at the electronic device 301 (e.g., selection of a workout "start" option). In some examples, detecting initiation of the exercise activity includes detecting user input at a second electronic device, different from the electronic device 301. For example, the user provides user input directed to a mobile electronic device, such as a smartphone or smart watch, associated with the user and in communication with the electronic device 301, such that the electronic device 301 determines that the exercise activity has been initiated.

In some examples, as shown in FIG. 3B, in response to detecting the initiation of the exercise activity, the electronic device 301 activates an exercise tracking mode of operation. In some examples, while the exercise tracking mode of operation is active, the electronic device 301 tracks (e.g., records) one or more fitness metrics associated with the exercise activity, as discussed in more detail below. In some examples, as shown in FIG. 3B, when the electronic device 301 activates the exercise tracking mode of operation, the electronic device 301 displays a visual indication 310 that the exercise tracking mode of operation has been activated (e.g., "Workout Activated") in the three-dimensional environment 350.

Figure 3C:
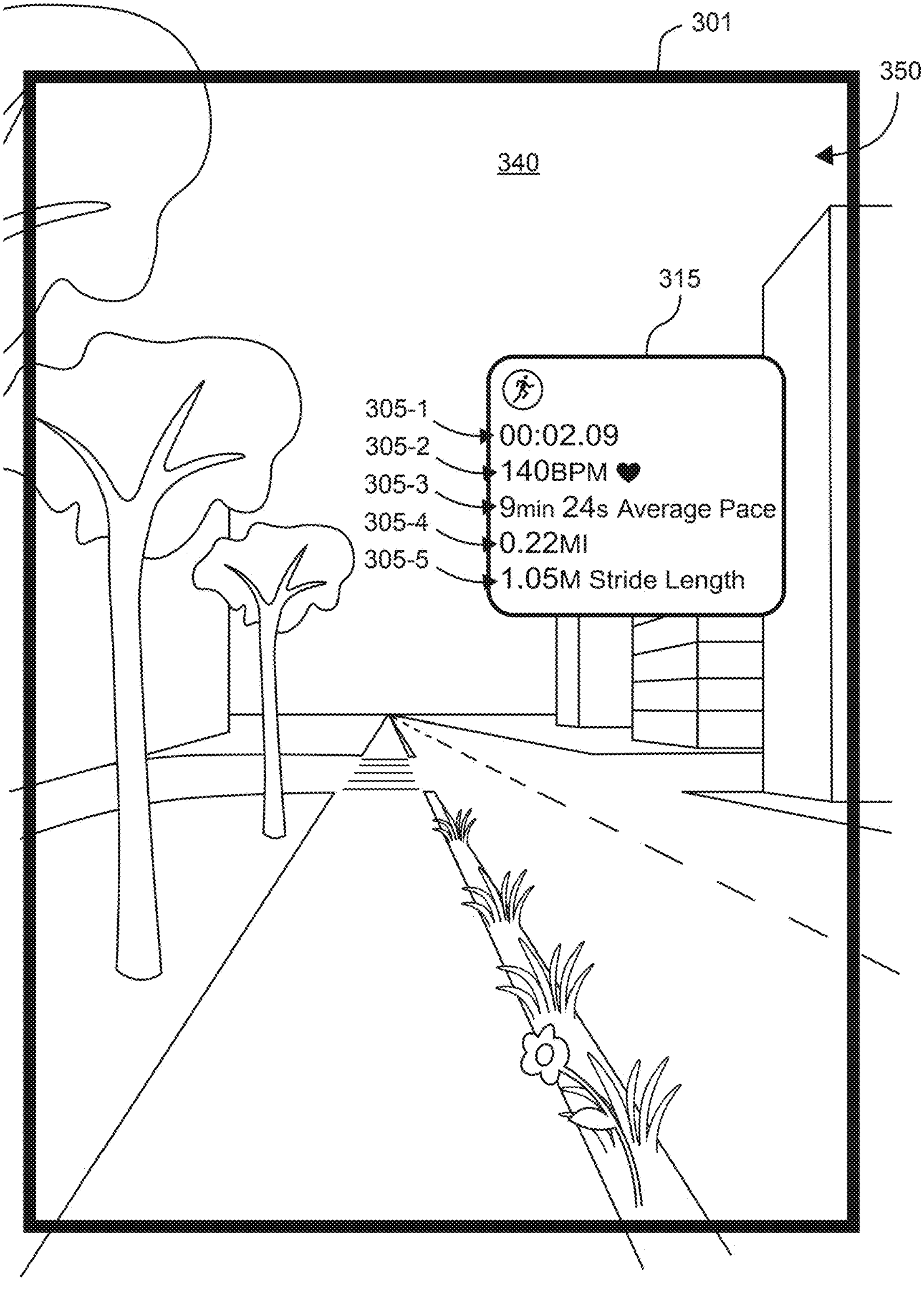

In some examples, as shown in FIG. 3C, while the exercise tracking mode of operation is active, the electronic device 301 displays a first user interface 315 associated with the exercise activity. In some examples, as shown in FIG. 3C, the first user interface 315 includes one or more representations of one or more fitness metrics associated with the exercise activity. For example, in FIG. 3C, the detected exercise activity is a running activity. Accordingly, as shown in FIG. 3C, the first user interface 315 includes a representation of a duration of the exercise activity (e.g., 2 minutes and 9 seconds) (305-1), a representation of a current determined heart rate of the user during the exercise activity (e.g., 140 beats per minute (BPM)) (305-2), a representation of an average running pace of the user during the exercise activity (e.g., 9 minutes and 24 seconds) (305-3), a representation of a distance associated with the exercise activity (e.g., 0.22 miles) (305-4), and a representation of a stride length of the user during the exercise activity (e.g., 1.05 meters) (305-5). In some examples, the electronic device 301 determines the one or more fitness metrics associated with the exercise activity based on detected vital signs of the user (e.g., heart rate) and/or the detected movement of the user. In some examples, the vital signs and/or the movement of the user are detected via one or more sensors integrated with the electronic device 301 and/or one or more sensors integrated with a second electronic device, such as a mobile electronic device, which is worn on a portion of the user (e.g., wrist or arm) and is in communication with the electronic device 301, as similarly discussed below.

In some examples, if the electronic device 301 detects a conclusion (e.g., end or termination) in the movement of the electronic device 301, the electronic device 301 deactivates the exercise tracking mode of operation. For example, if the user ceases moving within the city environment 340, the electronic device 301 also ceases to move (e.g., and/or moves below a movement threshold (e.g., 0, 0.1, 0.5, 0.75, 1, 1.5, etc. m/s)) in the city environment 340. In some examples, the electronic device 301 pauses the exercise tracking mode of operation for a threshold amount of time (e.g., 30 seconds, 1, 2, 3, 5, 10, etc. minutes) before initiating conclusion of the exercise tracking mode of operation. For example, if the electronic device 301 detects that the threshold amount of time has elapsed since detecting the end of the movement of the electronic device 301, the electronic device 301 automatically deactivates the exercise tracking mode of operation or displays a visual indication in the three-dimensional environment 350 prompting the user to confirm that the exercise activity has ended. In some examples, deactivating the exercise tracking mode of operation includes ceasing display of the first user interface 315 in the three-dimensional environment 350.

In some examples, the exercise activity may be associated with one or more goals (e.g., exercise goals/targets). For example, in FIG. 3C, the running activity is associated with a first distance-based goal, such as 0.5 miles, 1 mile, 2 miles, etc. In some examples, the exercise activity may be associated with other types of goals, such as time-based goals, calorie-based goals (e.g., burning a particular number of calories), intensity-based goals (e.g., based on a relative difficulty of the exercise), etc. In some examples, the exercise activity may be associated with a plurality of goals, either being progressed toward concurrently or being progressed toward individually (e.g., as a sequence of goals). In some examples, the one or more goals associated with the exercise activity are user-defined (e.g., user-selected), such as prior to initiating the exercise activity and/or when initiating the exercise activity (e.g., via a user interface of a fitness application operating on the electronic device 301 and/or on a second electronic device in communication with the electronic device 301, such as a mobile smartphone or smartwatch). In some examples, the one or more goals associated with the exercise activity are selected (e.g., automatically) by the electronic device 301 (e.g., by a fitness application operating on the electronic device 301 and/or on a second electronic device in communication with the electronic device 301). In some examples, the one or more goals associated with the exercise activity are user-defined and are selected by the electronic device 301. For example, the user of the electronic device 301 may set an overall goal for the exercise activity, and the electronic device 301 may, based on the overall goal, define one or more individual goals (e.g., a sequence of goals) that enable the user to meet their overall goal (e.g., the user defines a three-mile goal for the running activity, and the electronic device 301 defines three one-mile goals that enable the user, in sequence, to meet the three-mile goal). As another example, the user defines a calorie-based goal, such as burning 300 calories, and the electronic device 301 defines one or more distance-based goals (e.g., calculated based on user's prior running activities and/or based on user's average heart rate) that enable the user, in sequence or concurrently, to meet the calorie-based goal.

Figure 3D:
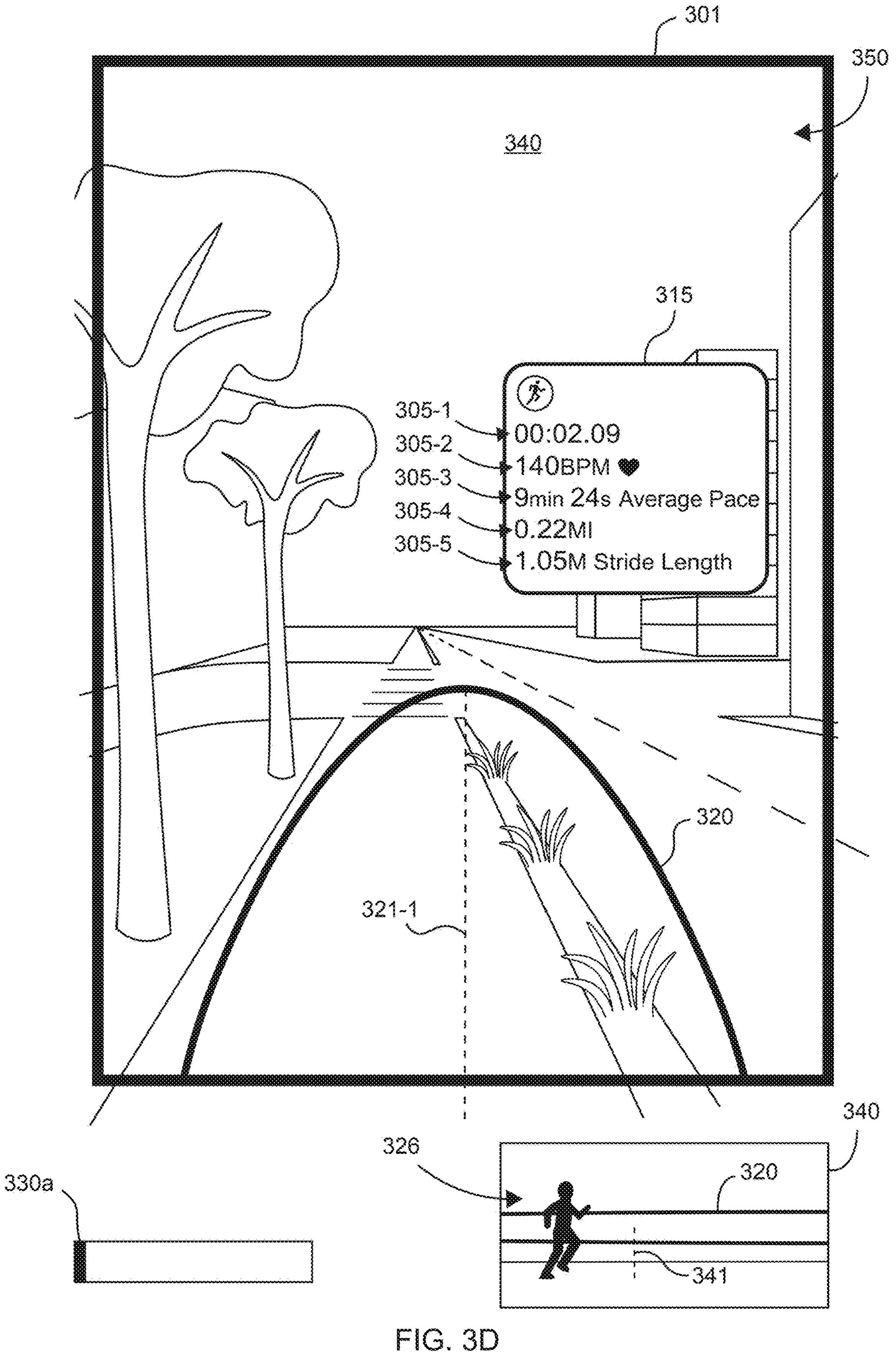

In some examples, in accordance with a determination that the exercise activity is associated with one or more goals, the electronic device 301 displays a user interface element representing the one or more goals in the three-dimensional environment 350. For example, as shown in FIG. 3D, the electronic device 301 is displaying a first user interface element 320 in the three-dimensional environment 350, which is optionally a virtual ring, oval, sphere, hula hoop, or other user interface element, that is associated with a first goal of the exercise activity. In some examples, as discussed herein, the display of the first user interface element 320 at a particular point in time is based on a current progress, indicated by progress bar 330*a*, of the user toward meeting the first goal that is associated with the exercise activity at the particular point in time. In the example of FIG. 3D, the first goal with which the first user interface element 320 is associated is a distance-based goal. For example, in FIG. 3D, a visual appearance of the first user interface element 320 indicates the user's current progress toward meeting the first goal (e.g., running 0.50 miles). It should be understood that, in some examples, the electronic device 301 displays the first user interface element 320 in the three-dimensional environment 350 without displaying the first user interface 315.

In some examples, the visual appearance of the first user interface element 320 includes a size of the first user interface element 320 in the three-dimensional environment 350. For example, as shown in FIG. 3D, the first user interface element 320 has a first radius 321-1 that indicates the current progress of the user toward running 0.50 miles. The size of the first user interface element 320 thus optionally determines a shape of the first user interface element 320 in the three-dimensional environment 350. For example, as mentioned above, the first user interface element 320 is displayed as a ring or hula hoop (or other circular/oval-shaped object) in the three-dimensional environment 350 and thus has a first amount of curvature relative to the viewpoint of the user based on the first radius 321-1. Additionally, in some examples, the visual appearance of the first user interface element 320 includes a thickness of the first user interface element 320 in the three-dimensional environment 350. For example, as shown in FIG. 3D, the first user interface element 320 has a first thickness, which is optionally based on the first radius 321-1, that indicates the current progress of the user toward running 0.50 miles. As discussed below, the electronic device 301 optionally decreases the radius of the first user interface element 320 as the user continues to progress toward the first goal, which causes the thickness of the first user interface element 320 to increase as well (e.g., because a farthest point on the first user interface element 320 has moved closer to the viewpoint of the user).

In some examples, the electronic device 301 displays the first user interface element 320 with a respective height 341 in the three-dimensional environment 350, as indicated in legend 342. For example, as shown in FIG. 3D, the electronic device 301 displays the first user interface element 320 with height 341 relative to a surface (e.g., the ground or floor) of the city environment 340, as indicated in the legend

342. In some examples, the electronic device 301 selects (e.g., determines, measures, calculates, etc.) the respective height 341 based on a body of the user 326 of the electronic device 301. For example, the electronic device 301 displays the first user interface element 320 at the height 341 that is centered on a waist of the user 326 (e.g., or another portion of the user's torso). In some examples, the electronic device 301 selects the respective height 341 of the first user interface element 320 to be a predetermined height relative to the surface of the city environment 340 (e.g., and irrespective of the height of the user's waist/torso).

Figure 3E:
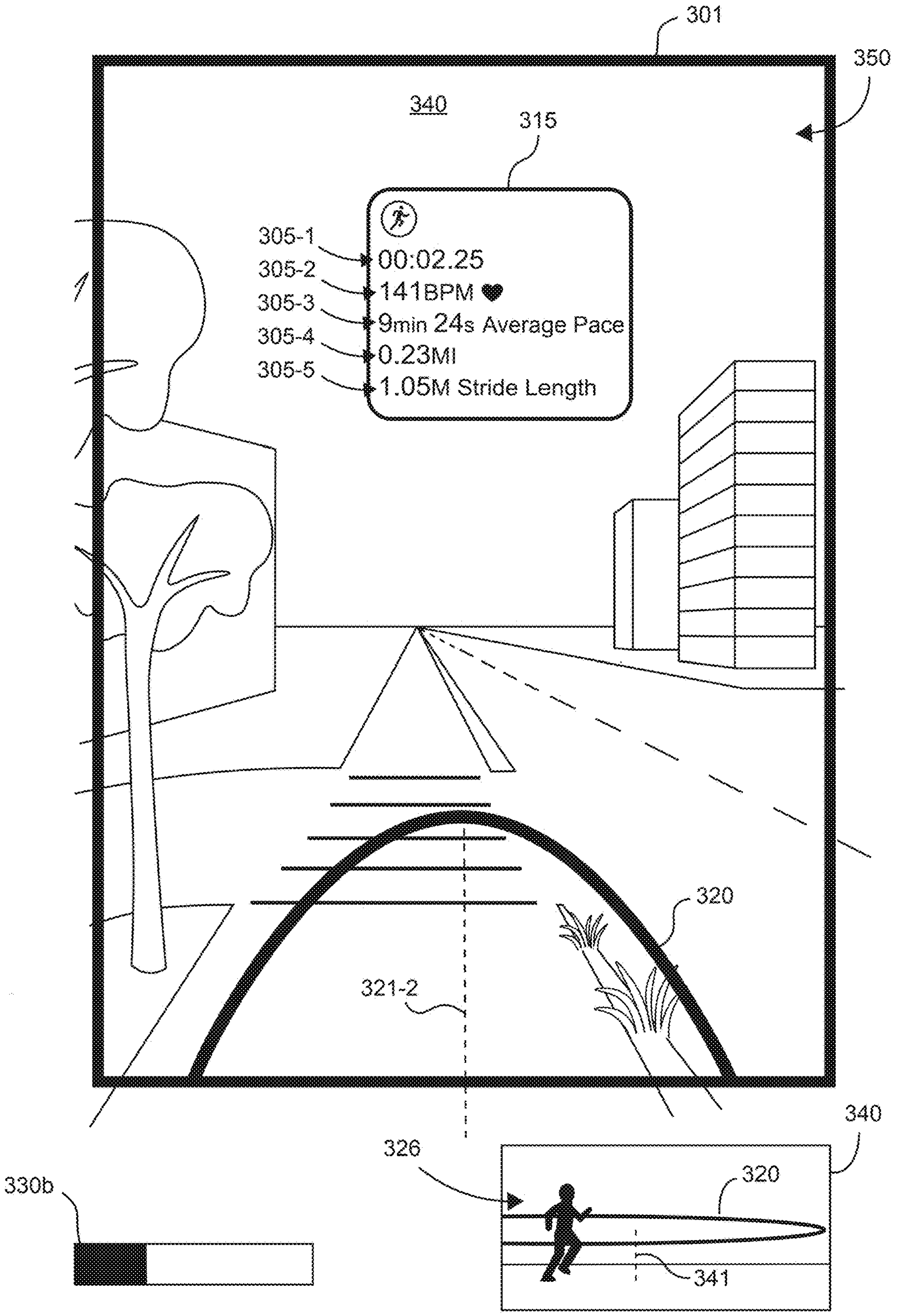

From FIGS. 3D to 3E, the electronic device 301 determines that the user has progressed further toward meeting the first goal associated with the exercise activity. For example, in FIG. 3E, the tracked/recorded distance that the user has run has increased, as indicated by the representation 305-4 in the first user interface 315 (e.g., the distance that the user has run has increased from 0.22 miles to 0.23 miles), which causes the user's progress to increase as well, as indicated by progress bar 330*b*. In some examples, in accordance with the determination that the user has progressed further toward meeting the first goal discussed above, the electronic device 301 updates display of the first user interface element 320 in the three-dimensional environment 350. For example, as shown in FIG. 3E, the electronic device 301 displays the first user interface element 320 with second radius 321-2, which is optionally smaller than the first radius 321-1, to indicate that the user has progressed further toward reaching the first goal. Additionally, as mentioned above, as shown in FIG. 3E, the electronic device 301 optionally increases the thickness of the first user interface element 320 in the three-dimensional environment 350 (e.g., because the farthest point on the first user interface element 320 is now closer to the viewpoint of the user than in FIG. 3D). In some examples, as shown in FIG. 3E, as the visual appearance (e.g., size, shape, and/or thickness) of the first user interface element 320 changes in the three-dimensional environment 350 based on changes in the user's progress toward meeting the first goal, the electronic device 301 maintains display of the first user interface element 320 at the height 341, as shown in the legend in FIG. 3E.

Figure 3F:
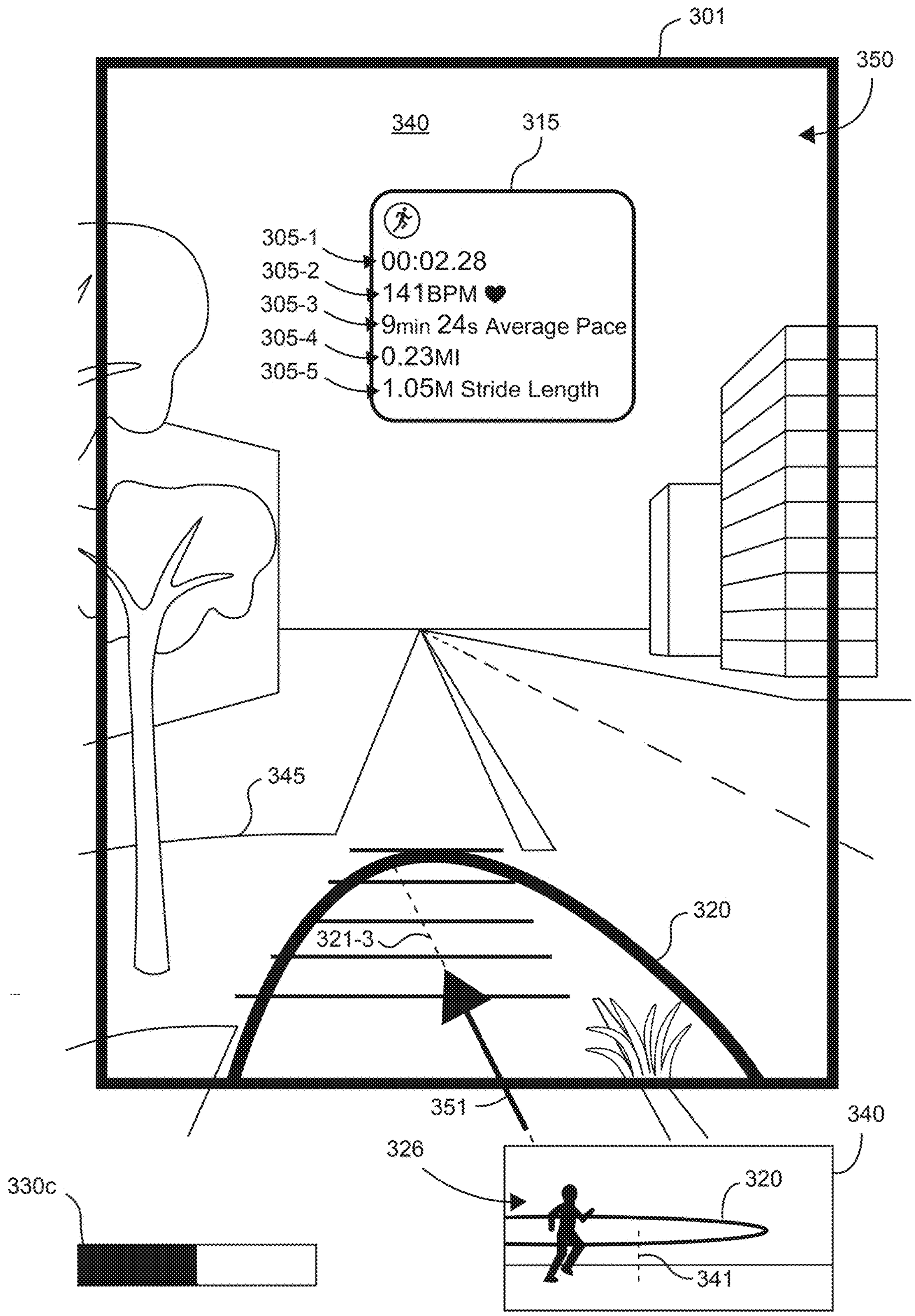

In some examples, the user's progress toward meeting the first goal associated with the exercise activity is independent of a direction of motion of the electronic device 301. For example, as discussed above, the first goal corresponds to a distance-based goal and is thus independent of the particular direction that the user is running in. As shown in FIG. 3F, the electronic device 301 detects a change in the direction of motion of the user. For example, because the electronic device 301 is worn on the user's head, the movement of the user leftward in the city environment 340, represented by arrow 351, the electronic device 301 is also moved leftward in the city environment 340 (e.g., and toward path 345 in the city environment 340). In some examples, as previously discussed above, in FIG. 3F, because the user has progressed further toward meeting the first goal associated with the exercise activity, as indicated by progress bar 330*c*, the electronic device 301 updates the visual appearance of the first user interface element 320 in the three-dimensional environment 350 (e.g., displays with first user interface element 320 with third radius 321-3, which is smaller than the first radius 321-1 and the second radius 321-2 discussed above, and/or increases the thickness of the first user interface element 320).

Figure 3G:
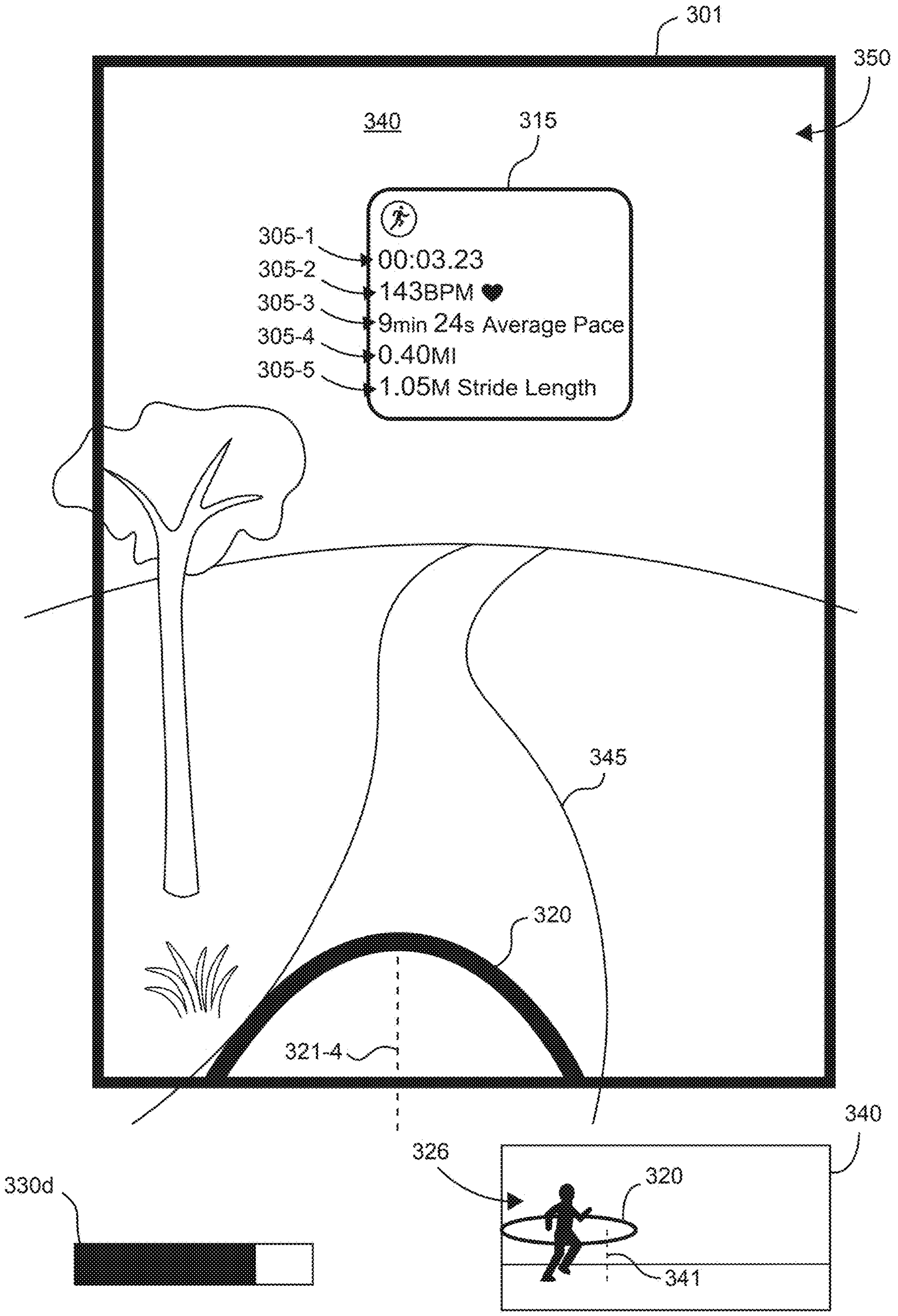

In some examples, a rate of change in the visual appearance of the first user interface element 320 changes in accordance with a determination that the user of the electronic device 301 has progressed to within a threshold progress of reaching the first goal associated with the exercise activity. For example, as shown in FIG. 3G, the user has progressed further toward reaching the 0.50-mile goal for the running activity. Accordingly, as previously discussed above, the electronic device 301 updates the visual appearance of the first user interface element 320 in the three-dimensional environment 350 to indicate that the user has progressed further toward meeting the first goal, as indicated by progress bar 330*d*. In some examples, in FIG. 3G, the distance that the user has run (e.g., 0.40 miles, as indicated by the representation 305-4 in the first user interface 315) is within a threshold distance of the first goal (e.g., is within 0.10, 0.12, 0.15, etc. of the 0.50-mile goal). Accordingly, in some examples, the electronic device 301 changes the rate of change in the visual appearance of the first user interface element 320 to correspond to a 1:1 rate of change. For example, in FIG. 3G, the electronic device 301 is displaying the first user interface element 320 with fourth radius 321-4 that has a 1:1 correlation with the user's current progress being at 0.40 miles relative to the 0.50-mile goal. In such a case, the electronic device 101 optionally decreases the radius of the first user interface element 320 (e.g., by 1 centimeter, by 1 inch, by 2 centimeters, by 2 inches, etc.) for a particular amount of distance run by the user (e.g., every 0.01 miles or every 0.02 miles) while within the threshold distance of the first goal. A similar rate of change may be applied when varying the thickness of the first user interface element 320.

Figure 3H:
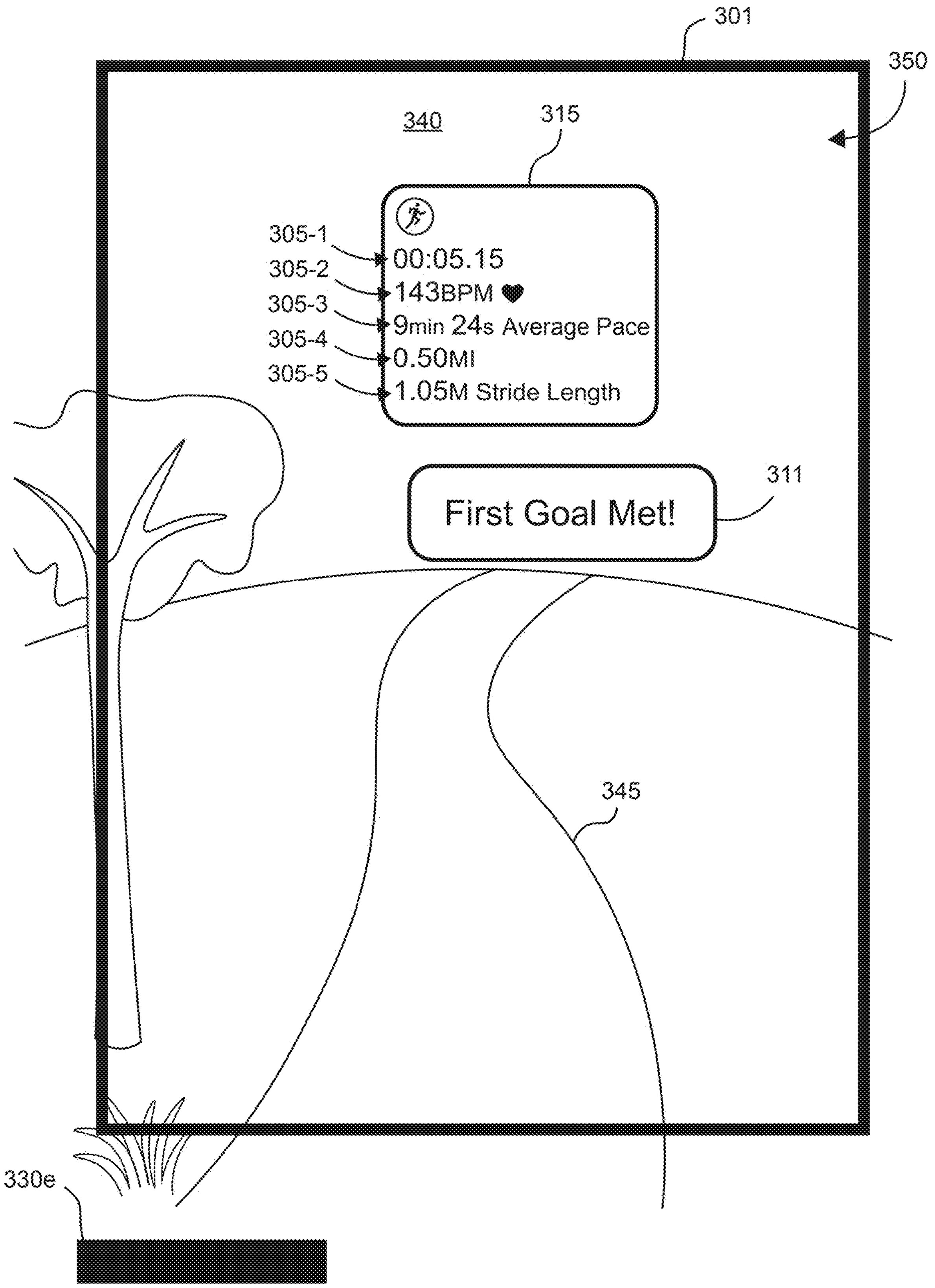

In FIG. 3H, the electronic device 301 determines that that the user has reached the first goal associated with the exercise activity. For example, as indicated by the representation 305-4 in the first user interface 315, the electronic device 301 determines that the user has run 0.50 miles, as indicated by progress bar 330*e*. Accordingly, in some examples, as shown in FIG. 3H, the electronic device 301 ceases display of the first user interface element 320 in the three-dimensional environment 350. Additionally, in some examples, when the user reaches the first goal associated with the exercise activity, the electronic device 301 displays visual indication 311 in the three-dimensional environment 350 notifying the user that they have reached the first goal.

Figure 3I:
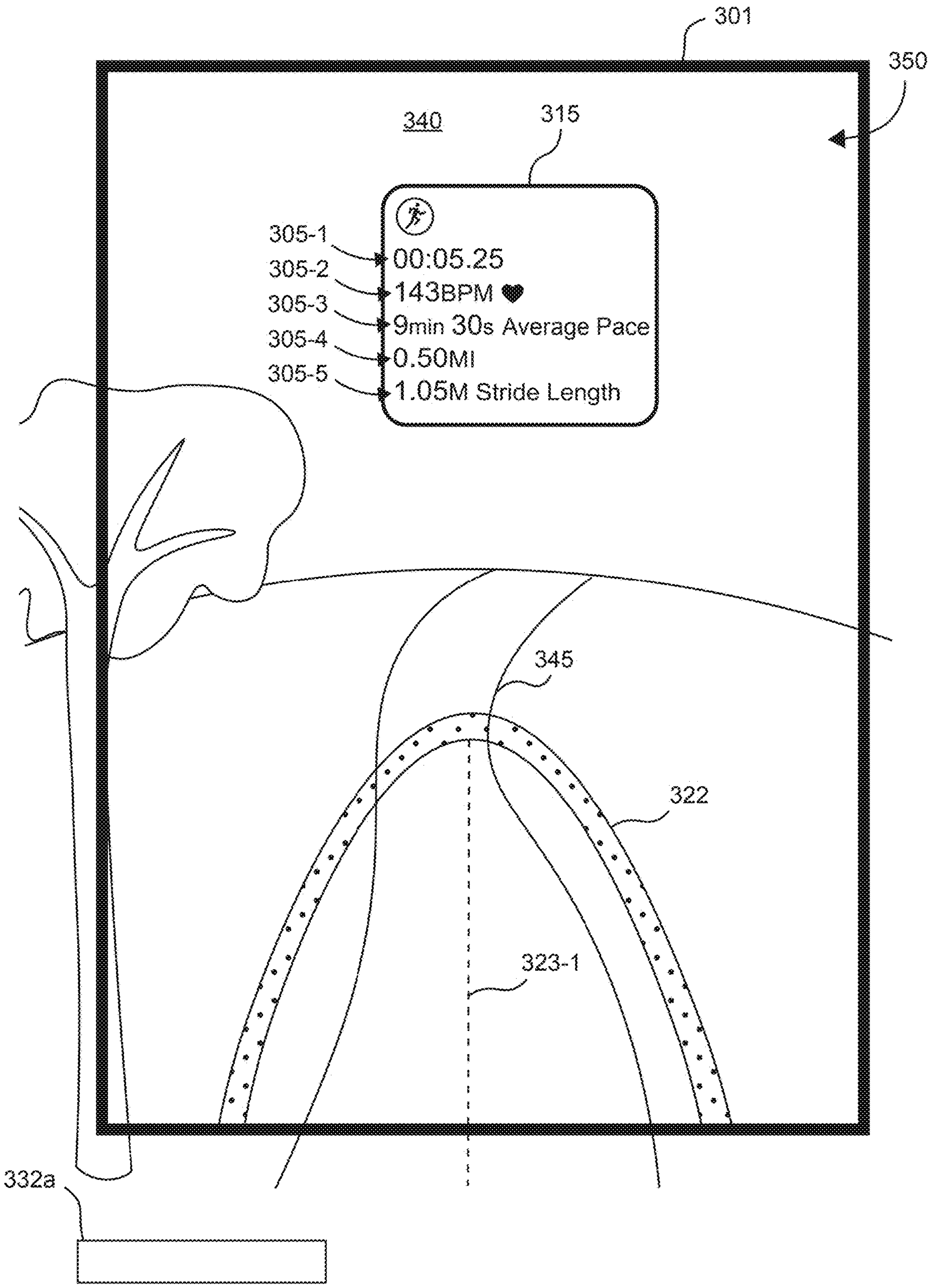

In some examples, the exercise activity is associated with a second goal, different from (e.g., and/or following) the first goal discussed above. In some examples, the first goal and the second goal belong to a sequence of goals associated with the exercise activity, as mentioned previously above. As discussed below, the second goal optionally corresponds to a time-based goal for the running activity. In some examples, as discussed above, the second goal is user-selected or is selected automatically by the electronic device 301. In the examples to follow, the time-based goal refers to an amount of time within which the user is to run a mile (e.g., 8 minutes). As shown in FIG. 3I, the electronic device 301 is displaying a second user interface element 322 in the three-dimensional environment 350 that is associated with the second goal. In some examples, the display of the second user interface element 322 has one or more characteristics of the display of the first user interface element 320 discussed above. For example, as shown in FIG. 3I, the second user interface element 322 is displayed with first radius 323-1 in the three-dimensional environment 350 and/or is displayed with a first thickness in the three-dimensional environment 350.

Figure 3J:
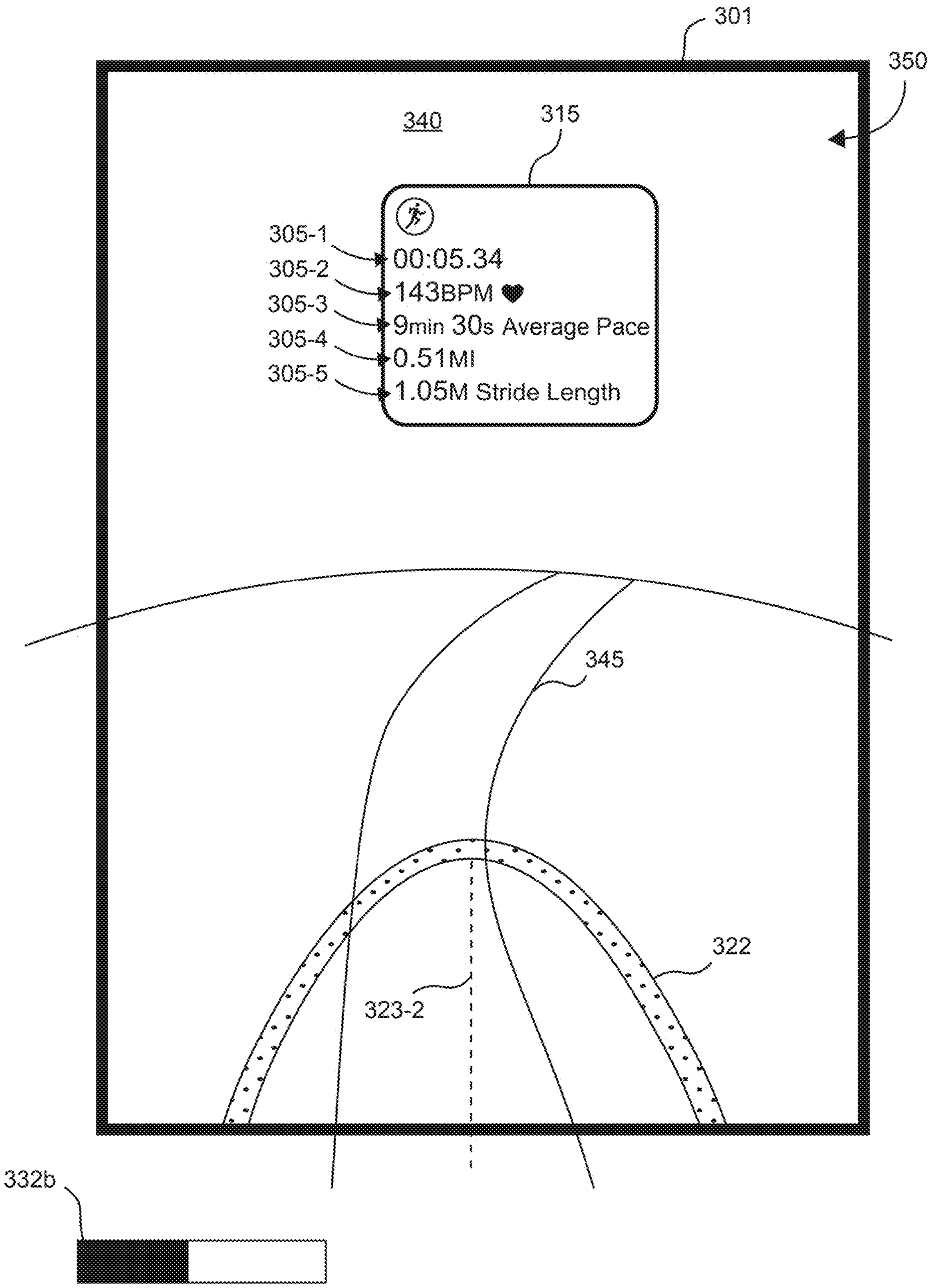

In FIG. 3J, the electronic device 301 determines that the user has progressed toward meeting the second goal associated with the exercise activity. For example, as shown via the representations 305-1 and 305-4 in the first user interface 315 in FIG. 3J, the user has run an additional 0.01 miles in nine seconds, which causes the user to progress toward meeting the 8-minute mile goal, as indicated by progression of progress bar 332*a* to 332*b*. Accordingly, as similarly described herein, the electronic device 301 updates the visual appearance of the second user interface element 322 in the three-dimensional environment 350. For example, as shown in FIG. 3J, the electronic device 301 displays the second user interface element 322 with second radius 323-2, which is smaller than the first radius 323-1 in FIG. 3I.

Figure 3K:
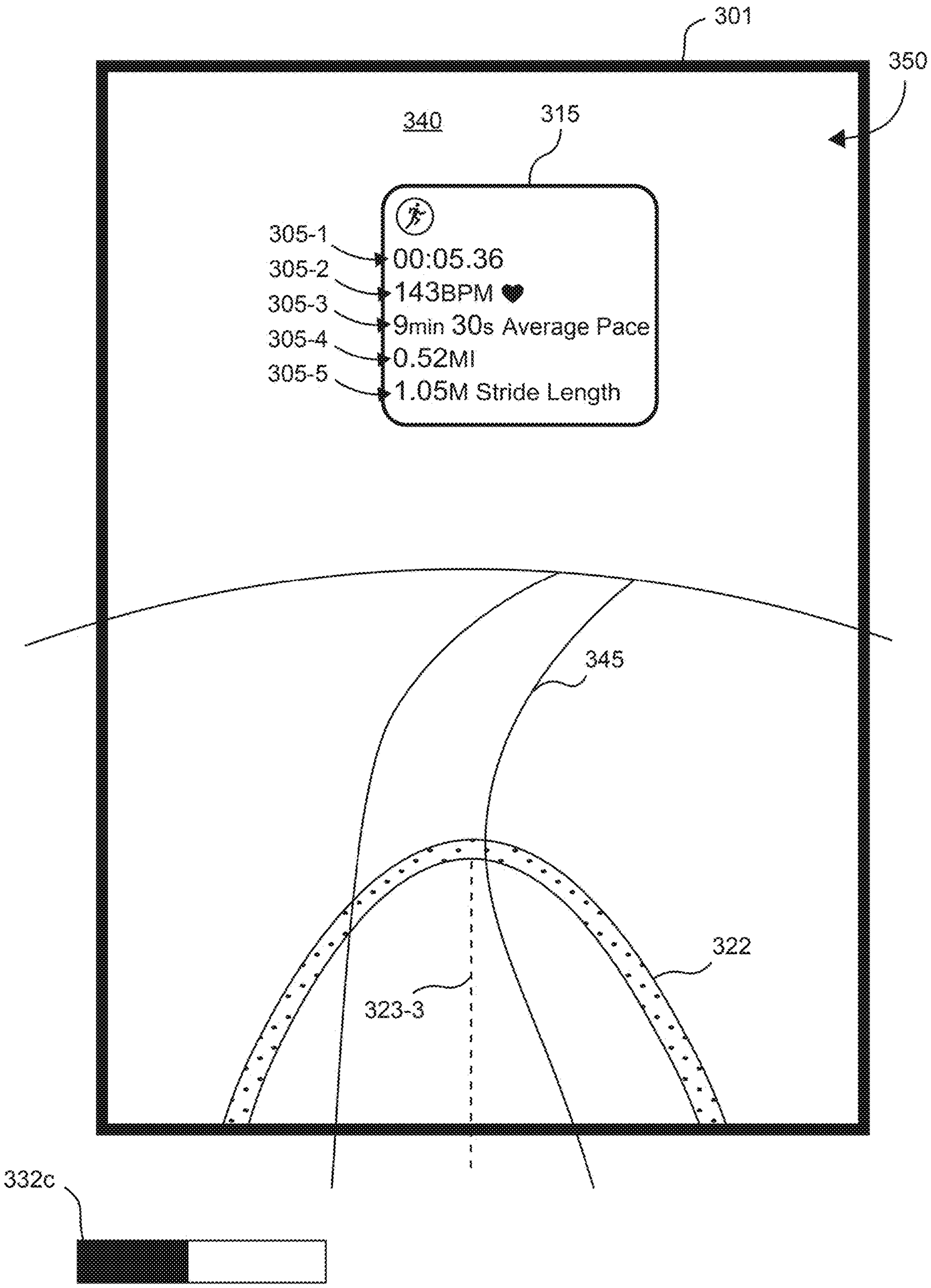

From FIGS. 3J to 3K, the electronic device 301 detects a pause in the movement of the user. For example, as indicated by the representation 305-4 in the first user interface 315, the electronic device 301 determines that the user is no longer running or walking, which causes the total distance for the running activity to remain stagnant at 0.52 miles. In some examples, when the electronic device 301 detects the pause in the movement of the user, the electronic device 301 determines that the user has not progressed toward meeting the second goal, as indicated by progress bar 332*c*. Accordingly, as shown in FIG. 3K, the electronic device 301 forgoes updating the visual appearance of the second user interface element 322 in the three-dimensional environment 350. For example, as shown in FIG. 3K, the electronic device 301 is displaying the second user interface element 322 with third radius 323-3, which is optionally equal to the second radius 323-2, in the three-dimensional environment 350 and/or maintains display of the second user interface element 322 with the same thickness shown in FIG. 3J.

Figure 3L:
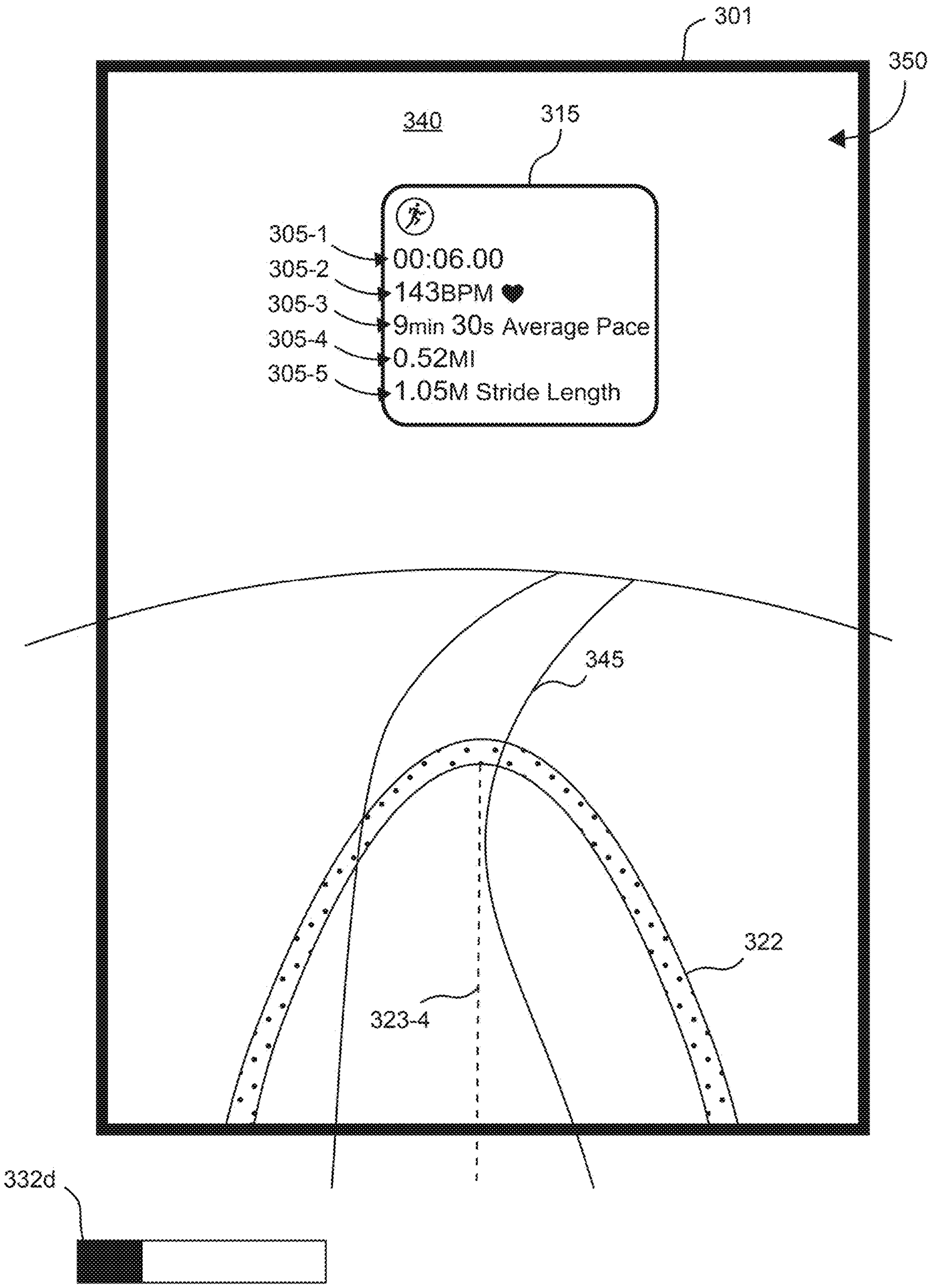

In FIG. 3L, the electronic device 301 determines that the user has continued to remain stationary/still. For example, as indicated by the representation 305-4 in the first user interface 315, the electronic device 301 has not detected movement of the user that causes the user to progress toward meeting the second goal associated with the exercise activity (e.g., the total distance that the user has run remains 0.52 miles). Further, the electronic device 301 determines that the user has remained stationary/still for an amount of time that causes the user to progress away from meeting the second goal. For example, as indicated by the representation 305-1 in the first user interface 315, the electronic device 301 determines that the user has not moved for an additional 50 seconds since detecting the pause in the movement in FIG. 3K. Because the second goal is a time-based goal (e.g., running a mile within 8 minutes), the progression of the total amount of time that the exercise activity has elapsed without detecting a progression of the total distance run by the user during the exercise activity causes the user to lose progress toward meeting the second goal. Accordingly, as shown in FIG. 3L, in some examples, the electronic device 301 updates display of the second user interface element 322 to be displayed with fourth radius 323-4 in the three-dimensional environment 350. As shown in FIG. 3L, the fourth radius 323-4 is optionally greater than the third radius 323-3 in FIG. 3K, which causes the size of the second user interface element 322 to increase, thereby indicating that the user has progressed away from meeting the second goal. Additionally, in some examples, the electronic device 301 decreases the thickness of the second user interface element 322 in the three-dimensional environment 350 to indicate that the user has progressed away from meeting the second goal.

Accordingly, one benefit of updating display of user interface elements associated with one or more goals during an exercise activity based on a current progress of the user toward meeting the one or more goals provides visual feedback to the user of their current progress, thereby improving user-device interaction. As another advantage, displaying a user interface element associated with a respective goal during the exercise activity helps provide motivation to the user for aiding the user in meeting the respective goal, which contributes to user fitness goals and overall health. Attention is now directed to examples of displaying user interfaces based on a direction and/or speed of motion of the user of the electronic device during an exercise activity.

Figure 4A:
FIGS. 4A-4J illustrate examples of an electronic device displaying one or more user interfaces associated with an exercise activity based on movement of the electronic device according to some examples of the disclosure.

FIGS. 4A-4J illustrate examples of an electronic device displaying one or more user interfaces associated with an exercise activity based on movement of the electronic device according to some examples of the disclosure. The electronic device 401 may be similar to device 101 or 201 discussed above, and/or may be a head mountable system/device and/or projection-based system/device (including a hologram-based system/device) configured to generate and present a three-dimensional environment, such as, for example, heads-up displays (HUDs), head mounted displays (HMDs), windows having integrated display capability, or displays formed as lenses designed to be placed on a person's eyes (e.g., similar to contact lenses). In some examples, the electronic device 401 corresponds to electronic device 301 discussed above. In some examples, as shown in FIG. 4A, the electronic device 401 is presenting three-dimensional environment 450 (e.g., a computer-generated environment) viewed from a perspective of the electronic device (e.g., a viewpoint associated with the user of the electronic device 301). In some examples, the three-dimensional environment 450 corresponds to three-dimensional environment 350 discussed above.

As shown in FIG. 4A, the electronic device 401 may be positioned in a physical environment (e.g., an outdoors environment) that includes a plurality of real-world objects. For example, in FIG. 4A, the electronic device 401 may be positioned in a city environment or a physical environment 440 that includes a plurality of buildings, sidewalks, roads, greenery (e.g., flowers, grass, shrubbery, trees, plants, etc.), streetlamps, streetlights, and the like (e.g., the user of the electronic device 401 is standing or walking on a sidewalk in the physical city environment). Accordingly, in some examples, the three-dimensional environment 450 presented using the electronic device 401 optionally includes captured portions of the physical environment (e.g., the city environment 440) surrounding the electronic device 401, such as one or more representations of one or more buildings in the field of view of the three-dimensional environment 450. In some examples, the city environment 440 corresponds to city environment 440 discussed above. In some examples, the representations can include portions of the physical environment viewed through a transparent or translucent display of electronic device 401.

Figure 4B:
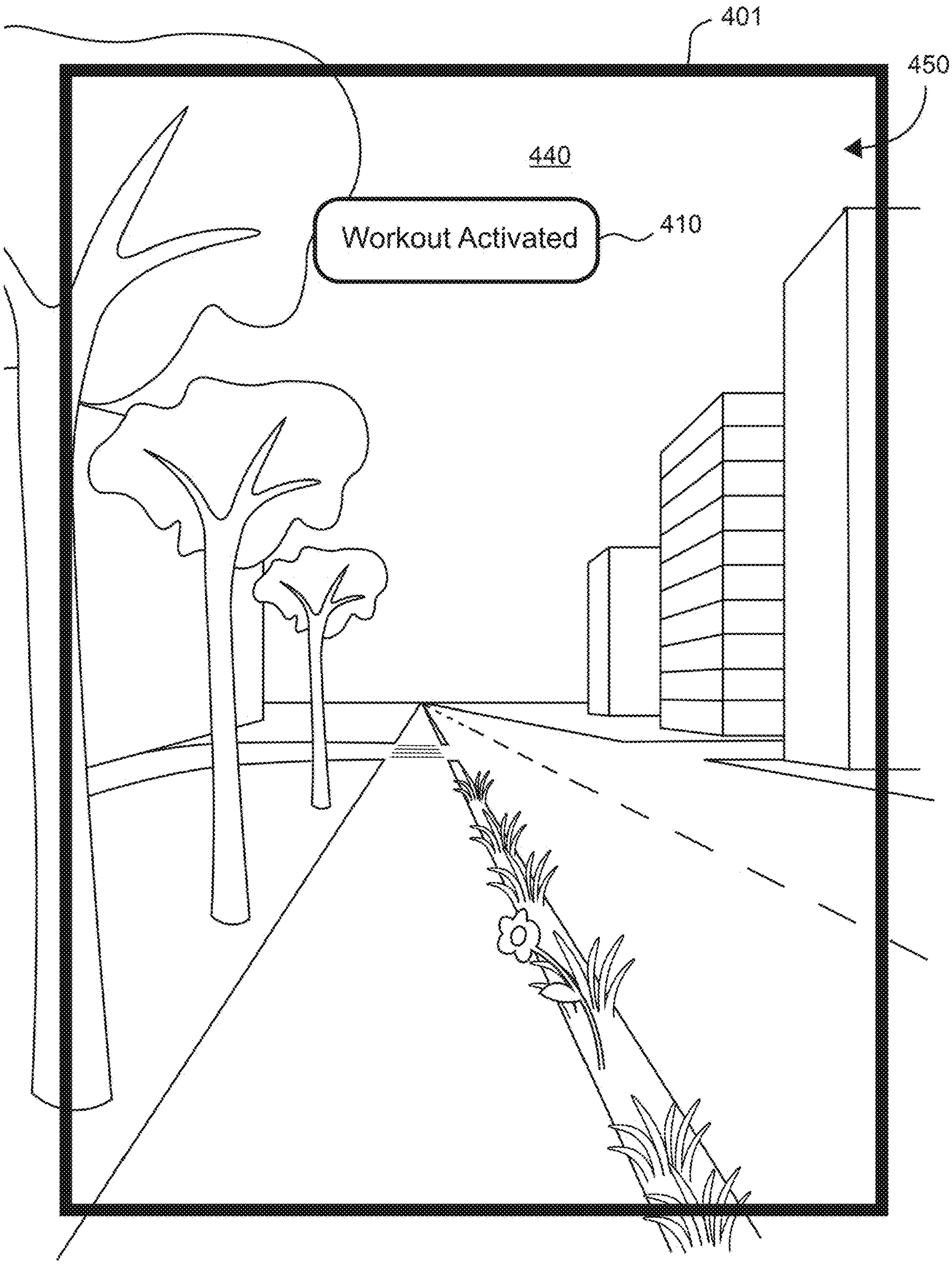

In FIG. 4B, the electronic device 401 detects initiation of an exercise activity associated with the user of the electronic device 401. For example, from FIGS. 4A to 4B, the electronic device 401 detects, via one or more sensors (e.g., such as the sensor(s) described with reference to FIG. 2), movement of the electronic device 401 within the physical environment 440 caused by movement of the user of the electronic device 401. In some examples, the exercise activity corresponds to a walking activity, a running activity, a cycling activity, a lunging activity, among other possibilities, which produces movement of the electronic device 401 in the city environment 440. In some examples, detecting initiation of the exercise activity has one or more characteristics of the same described previously above with reference to FIGS. 3A-3L.

In some examples, as shown in FIG. 4B, in response to detecting the initiation of the exercise activity, the electronic device 401 activates an exercise tracking mode of operation. In some examples, while the exercise tracking mode of operation is active, the electronic device 401 tracks (e.g., records) one or more fitness metrics associated with the exercise activity, as discussed in more detail below. In some examples, as shown in FIG. 4B and as similarly described above, when the electronic device 401 activates the exercise tracking mode of operation, the electronic device 401 displays a visual indication 410 that the exercise tracking mode of operation has been activated (e.g., "Workout Activated") in the three-dimensional environment 450.

Figure 4C:
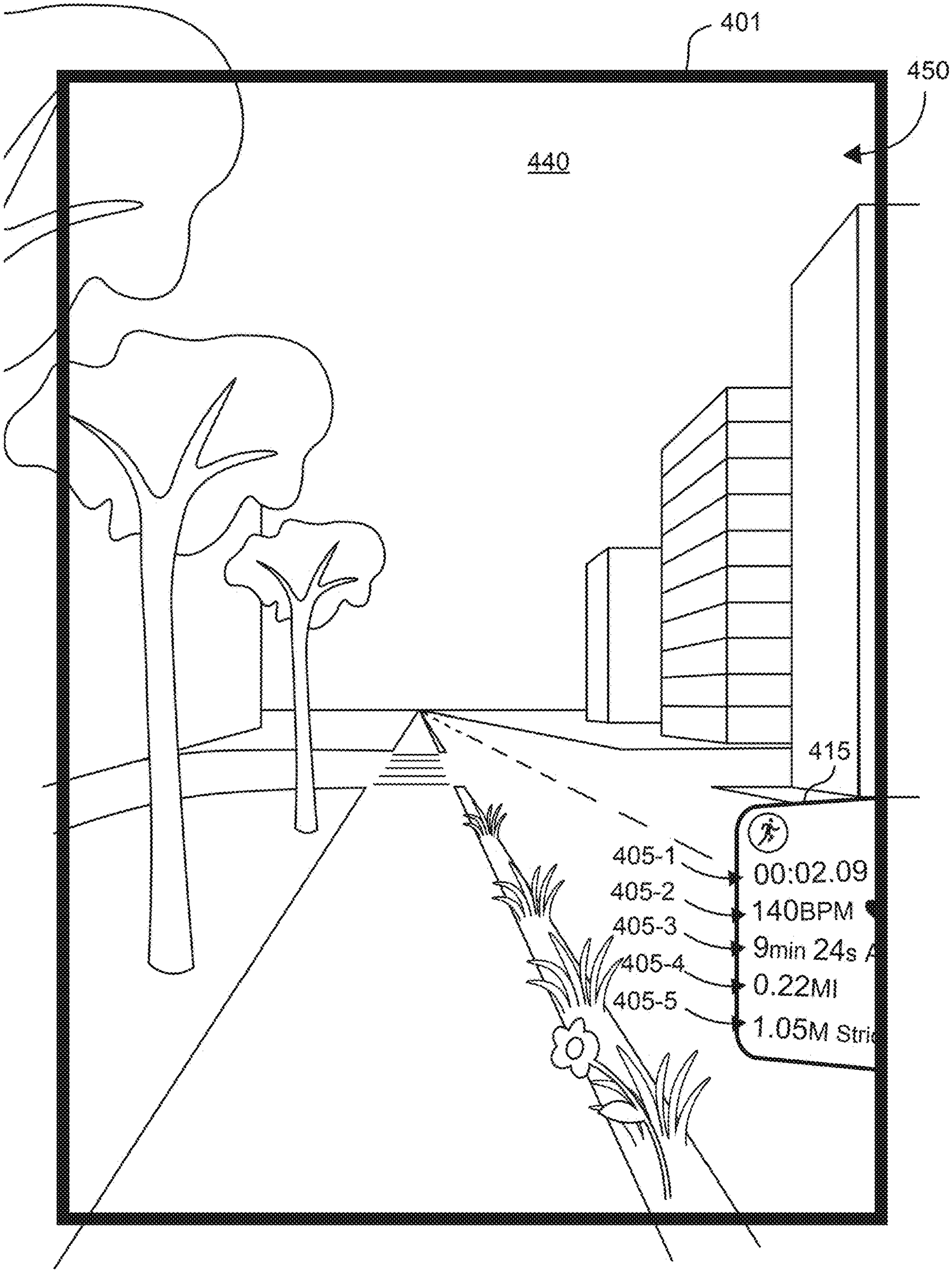

In some examples, as shown in FIG. 4C, while the exercise tracking mode of operation is active, the electronic device 401 displays a first user interface 415 associated with the exercise activity. In some examples, as shown in FIG. 4C, the first user interface 415 includes one or more representations of one or more fitness metrics associated with the exercise activity. In some examples, the first user interface 415 has one or more characteristics of first user interface 315 described above. In some examples, as previously discussed above, the electronic device 401 determines the one or more fitness metrics associated with the exercise activity based on detected vital signs of the user (e.g., heart rate) and/or the detected movement of the user.

In some examples, the electronic device 401 positions the first user interface 415 at a location in the three-dimensional environment 450 that enables the user to maintain an open and unobscured view of the portion of the city environment 440 that lies ahead of the user. For example, as shown in FIG. 4C, the electronic device 401 is positioning the first user interface 415 at a location that is at least partially outside of a current field of view of the user of the electronic device 401. Accordingly, as shown in FIG. 4C, the display of the first user interface 415 is at least partially clipped, such that the representations 405-1 through 405-5 of the one or more fitness metrics are not fully visible to the user from the current viewpoint of the electronic device 401. As shown in FIG. 4C, the electronic device 401 is positioning the first user interface 415 at a location that is offset of a center of the field of view of the electronic device 401 (e.g., downward and to the right of the center of the field of view). In this way, as alluded to above, the first user interface 415 does not occlude and/or overlap physical objects in the city environment 440, such as pedestrians, pets, trees, signs, etc. with which the user could collide should the first user interface 415 occlude and/or overlap them, as would a head-locked or body-locked user interface. Accordingly, as discussed below, the placement of the first user interface 415 as shown in FIG. 4C optionally enables the center portions of the field of view of the user to remain open and unobscured by any virtual elements, thereby helping to reduce distractions, overcrowding of the field of view, and/or blocking of physical objects as the user runs in the city environment 440.

In some examples, as shown in FIG. 4C, the first user interface 415 is displayed with a respective orientation that is angled to face toward the viewpoint of the user in the three-dimensional environment 450. For example, as shown in FIG. 4C, the electronic device 401 angles the front-facing surface of the first user interface 415 leftward in the three-dimensional environment 450 such that the first user interface 415 is facing toward the viewpoint of the user (e.g., and the portions of the representations 405-1 through 405-5 that are displayed in the three-dimensional environment 450 are easily viewable (e.g., legible) to the user). In some examples, in accordance with a determination that the viewpoint of the user shifts and/or rotates relative to the three-dimensional environment 450, the electronic device 401 visually updates (e.g., rotates) the orientation of the first user interface 415 to maintain the first user interface 415 as being directed toward the updated viewpoint of the user. In some examples, the electronic device 401 forgoes visually updating the orientation of the first user interface 415 in response to detecting a change in the viewpoint of the user in the three-dimensional environment 450.

Figure 4D:
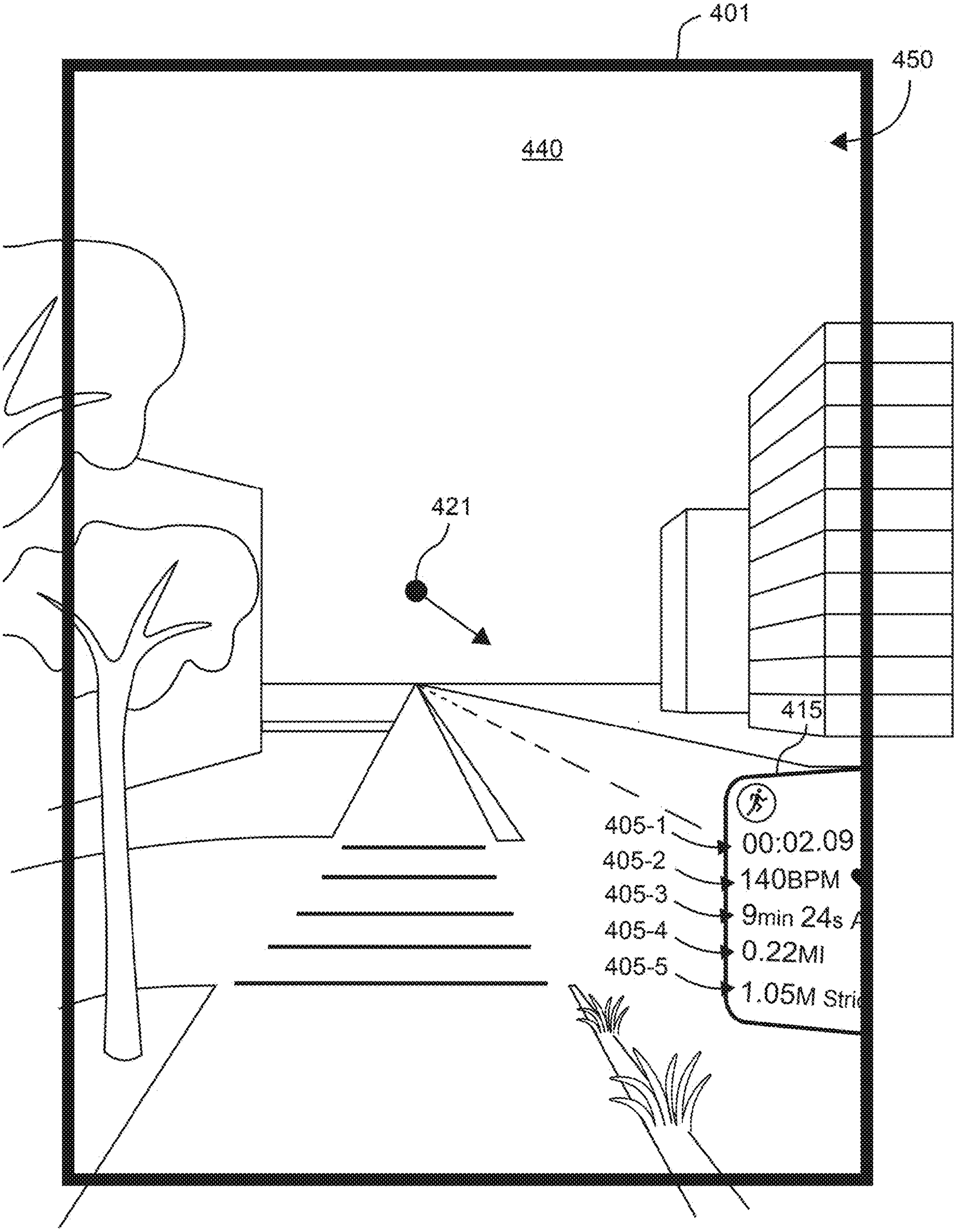

In some examples, while the first user interface 415 is displayed in the three-dimensional environment 450, the user is able to rotate their head to shift the viewpoint of the user in the three-dimensional environment 450, which optionally causes the first user interface 415 (e.g., additional portions of the first user interface 415) to become more or fully visible in the field of view of the user. For example, as shown in FIG. 4D, while gaze 421 is directed ahead (e.g., toward the center of the field of view) in the three-dimensional environment 450, the electronic device 401 detects movement of the viewpoint of the user. In some examples, the movement of the viewpoint of the user is caused by movement of the head of the user on which the electronic device 401 is worn. In some examples, as indicated in FIG. 4D, a direction of the movement of the viewpoint is in a direction of the first user interface 415 (e.g., downward and to the right of the center of the field of view).

Figure 4E:
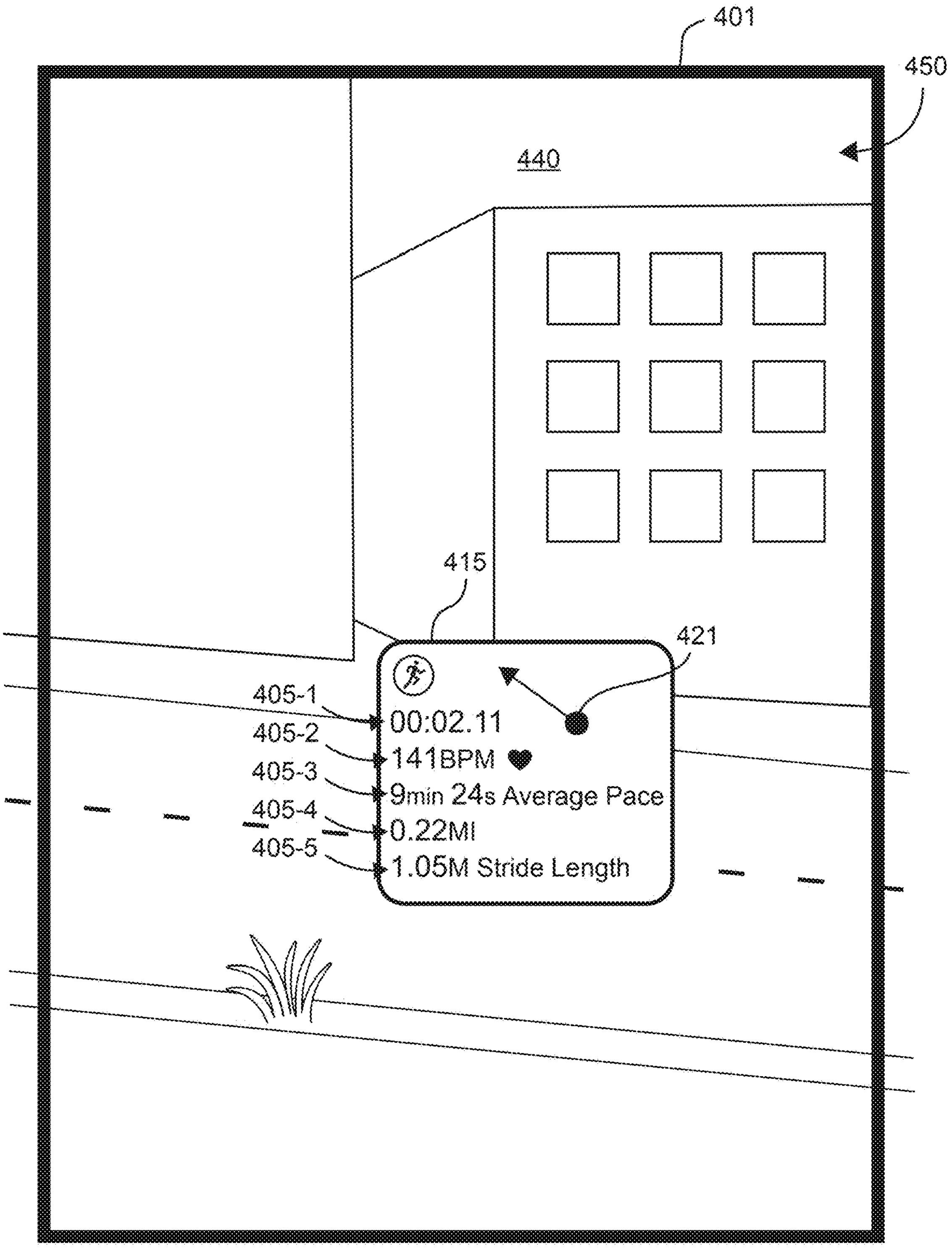

In some examples, as shown in FIG. 4E, in response to detecting the movement of the viewpoint of the user, the portion of the city environment 440 that is included in the three-dimensional environment 450 is updated based on the updated viewpoint of the user. For example, as shown in FIG. 4E, the road adjacent to the user's running path (e.g., the sidewalk) now lies ahead of the user's viewpoint and additional buildings that lie across the road from the user become visible in the field of view of the user. Additionally, as shown in FIG. 4E, when the viewpoint of the user is updated relative to the three-dimensional environment 450, the first user interface 415 optionally becomes fully visible in the field of view of the user from the updated viewpoint. For example, as shown in FIG. 4E, the representations 405-1 through 405-5 of the one or more fitness metrics displayed in the first user interface 415 are no longer at least partially clipped relative to the updated viewpoint. As shown in FIG. 4E, with the gaze 421 directed to the first user interface 415, the user is able to read/view one or more of the representations 405-1 through 405-5 while continuing to run in the city environment 440 (e.g., the user is currently looking downward and to the right toward the first user interface 415 (e.g., compared to the viewpoint of FIG. 4D) while continuing to run along the sidewalk of FIG. 4D).

Figure 4F:
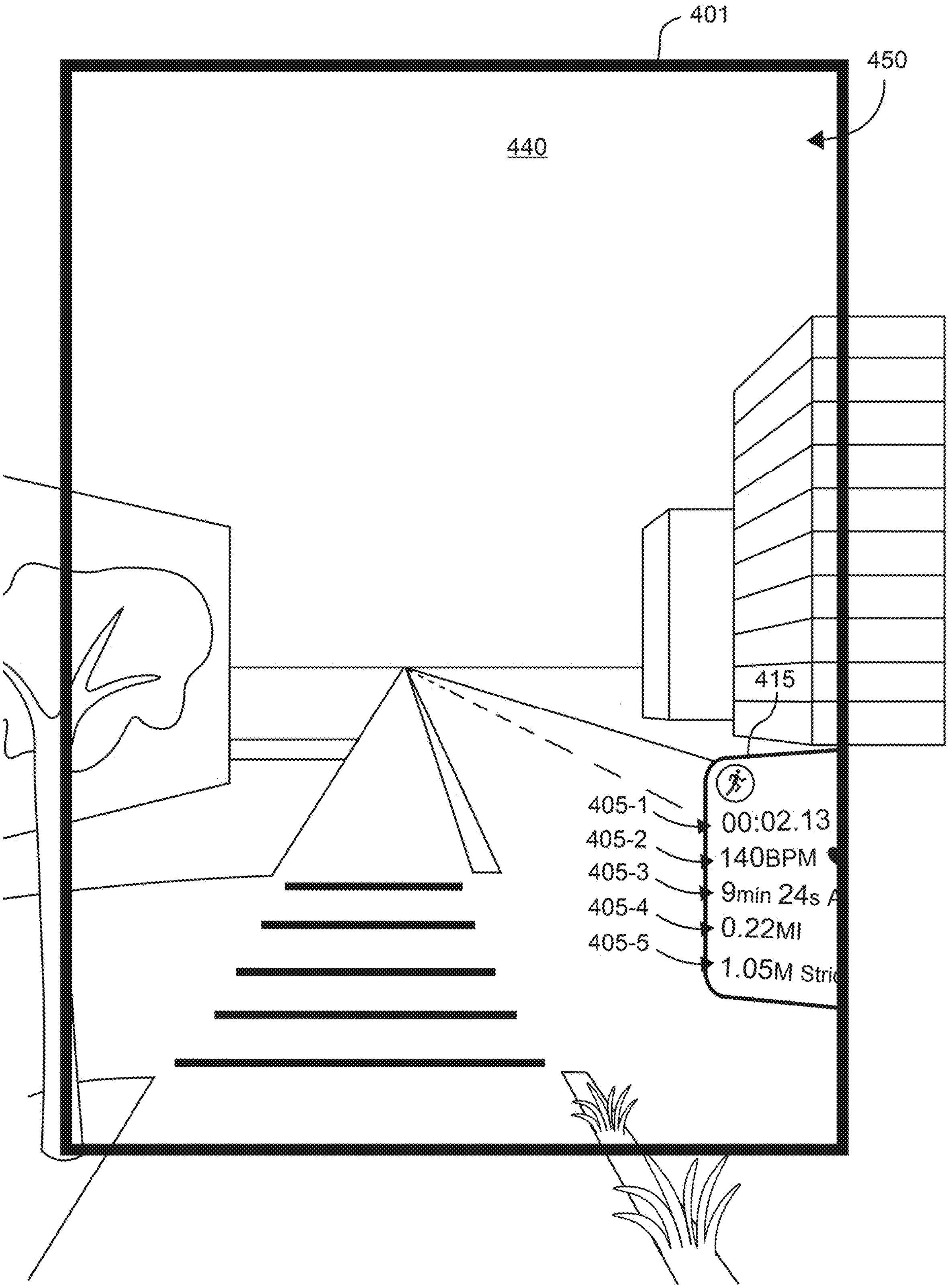

In FIG. 4E, the electronic device 401 detects further movement of the viewpoint of the user. For example, as indicated in FIG. 4E, the electronic device 401 detects the head of the user move upward and leftward away from the first user interface 415 (e.g., returning to the viewpoint of FIG. 4D). In some examples, as shown in FIG. 4F, in response to detecting the movement of the viewpoint of the user, the portion of the city environment 440 that is included in the three-dimensional environment 450 is updated based on the updated viewpoint of the user. As shown in FIG. 4F, the viewpoint of the user is returned to being oriented along the sidewalk on which the user is running in the city environment 440 (e.g., similar to as previously shown in FIG. 4D).

In some examples, as shown in FIG. 4F, when the viewpoint of the user is updated relative to the three-dimensional environment 450, the electronic device 401 forgoes moving the first user interface 415 in the three-dimensional environment 450 in accordance with the movement of the viewpoint. For example, as shown in FIG. 4F, the first user interface 415 returns to being positioned at least partially outside of the current field of view of the user (e.g., downward and rightward relative to the user's current viewpoint). Accordingly, as shown in FIG. 4F, the representations 405-1 through 405-5 return to being at least partially clipped (e.g., no longer displayed) relative to the current viewpoint of the user, as similarly discussed above. Accordingly, as illustrated in the examples above, the first user interface 415 is positioned at a location (e.g., not necessarily the same location) in the three-dimensional environment 450 that is at least partially outside the current field of view of the user to enable physical objects ahead of the user to remain unobscured by the first user interface 415, and, if the user desires to view the representations 405-1 through 405-5 in the first user interface 415, the user is able to quickly glance (e.g., by shifting their viewpoint as discussed above) at the first user interface 415 in the three-dimensional environment 450 and subsequently return to their exercise activity.

It should be understood that, in some examples, the first user interface 415 may be positioned completely outside the current field of view of the user when the user is looking directly ahead (e.g., when a forward-facing vector of the electronic device 101 is aligned with a horizon of the three-dimensional environment 400 (e.g., a horizontal line or plane through a center of the field of view) or is aligned with another "forward" and center direction). Additionally or alternatively, in some examples, the first user interface 415 is positioned directly in front and below the field of view of the user (e.g., aligned to a ground of the physical environment 440) when the user is looking directly ahead, as similarly discussed in more detail below. In some examples, the first user interface 415 is alternatively positioned to the left of the user's field of view (e.g., rather than to the right as shown in FIG. 4F) when the user is looking directly ahead. In other examples, the first user interface 415 is displayed at any other desired or suitable position within the three-dimensional environment 400 (e.g., as a matter of design and/or implementation).

Figure 4G:
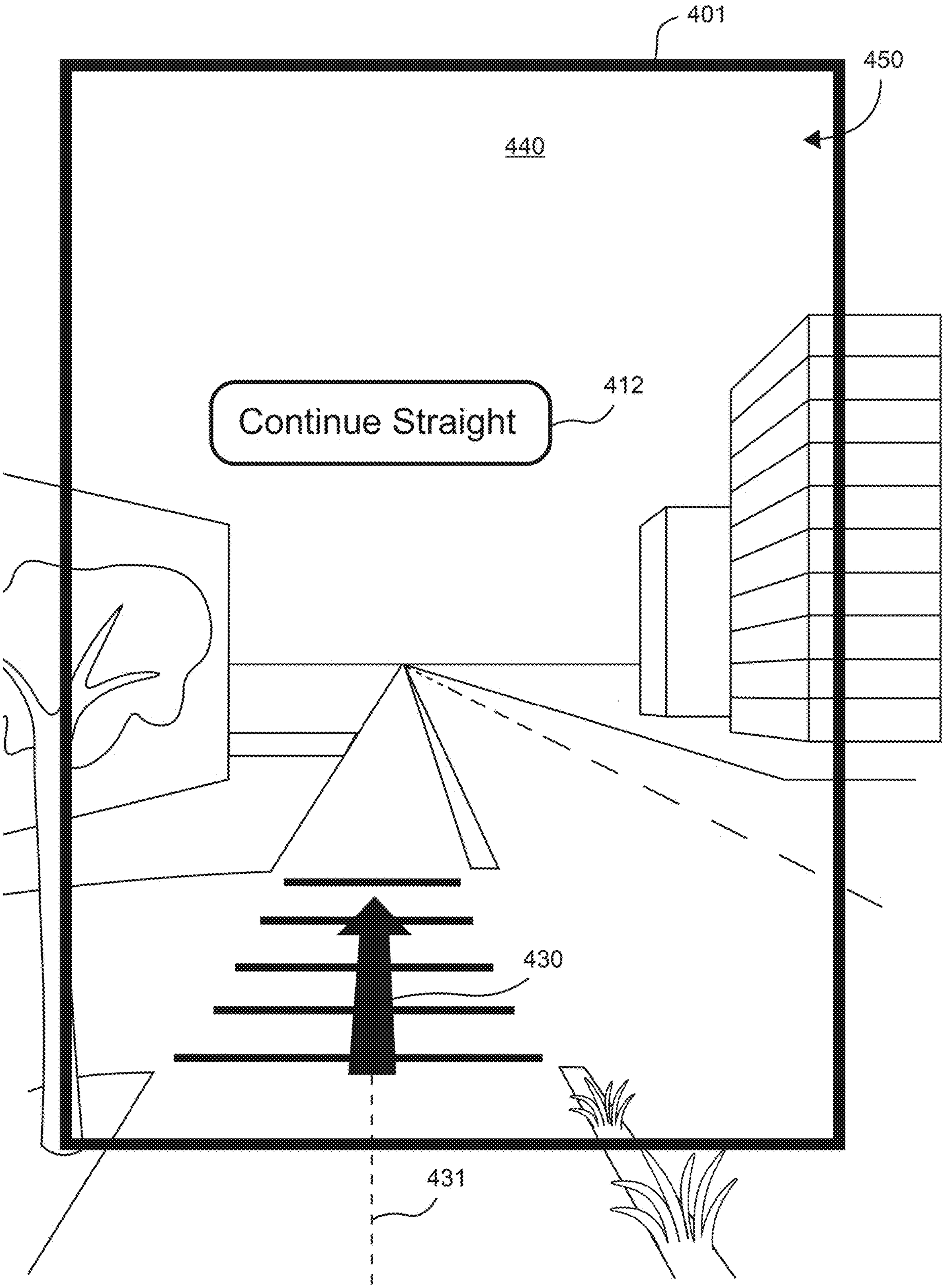
Figure 4H:
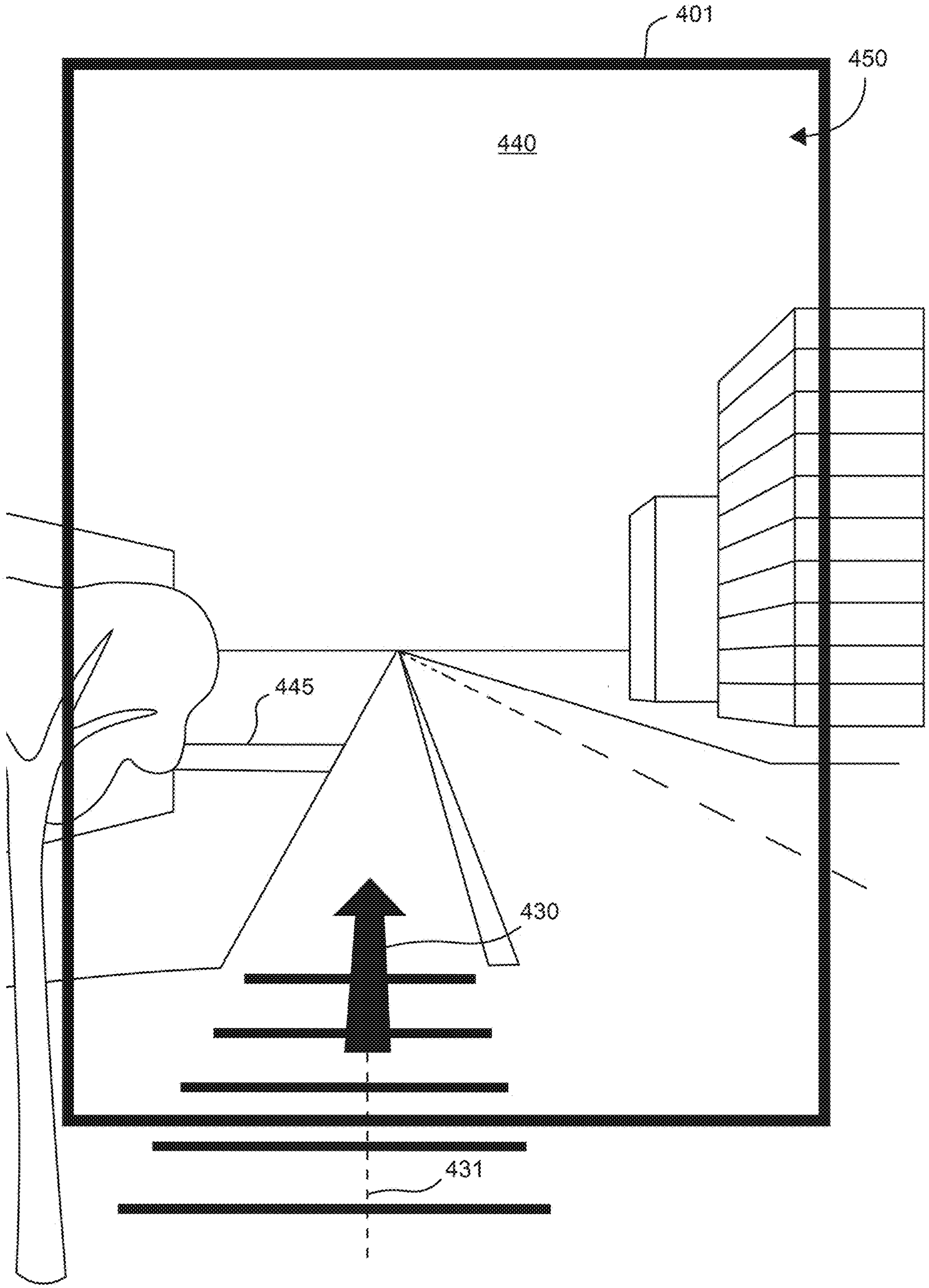
Figure 4I:
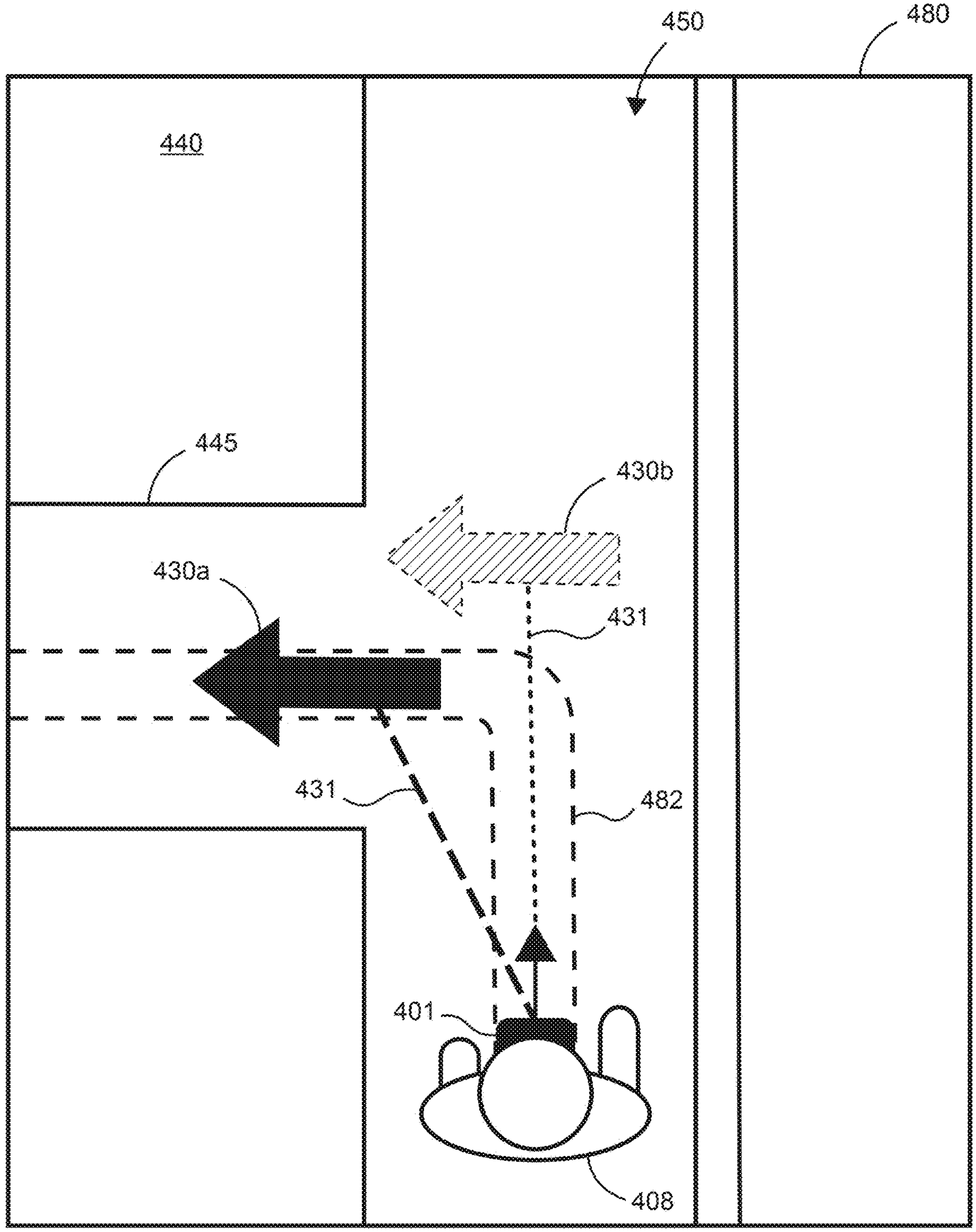

In some examples, the first user interface 415 may alternatively be positioned at least partially (e.g., partially within or completely outside of the current field of view of the user) in the three-dimensional environment 450 when the user is looking directly ahead based on a movement vector of the user (e.g., a detected movement direction of the user over a particular interval of time (e.g., predetermined intervals during the exercise activity or for a duration of the exercise activity)), as similarly described below with reference to FIGS. 4G-4I. In some examples, positioning the first user interface 415 in the three-dimensional environment 450 based on the movement vector of the user helps account for situations in which the user changes directions in the physical environment (e.g., caused by changes in the direction of movement of the user and/or changes in the current viewpoint of the user). For example, positioning the first user interface 415 according to one of the locking orientations defined herein (e.g., head-locked, body-locked, and/or world-locked) could result in inconsistent placement of the first user interface 415 in the three-dimensional environment 400 relative to the viewpoint of the user, which could cause eye strain for the user and/or produce some other discomfort or distraction for the user.

In FIG. 4G, the electronic device 401 is displaying an alternative user interface that is associated with the exercise activity (e.g., running activity) discussed above. In some examples, as shown in FIG. 4G, the three-dimensional environment 450 includes visual indication 430 that is associated with the exercise activity. For example, in FIG. 4G, the running activity is a guided running activity that is associated with a fitness application running on the electronic device 401. In some examples, the visual indication 430 provides a visual indication of a direction and/or a path along which the user is to perform the exercise activity. For example, in FIG. 4G, the visual indication 430 is provided as an arrow that is currently pointing straight ahead, which visually indicates to the user to continue running straight along the sidewalk in the city environment 440 (e.g., toward a particular destination and/or based on GPS data). In some examples, the visual indication 430 is associated with a navigation application running on the electronic device 401 that is providing visual instructions for navigating (e.g., walking, running, or cycling) to a particular user-selected destination. For example, the electronic device 401 is also displaying indication 412 that includes textual cues for guiding the user to a particular destination (e.g., "Continue Straight").

In some examples, the electronic device 401 displays the visual indication 430 at a location in the three-dimensional environment 450 that is a predetermined distance 431 from the current viewpoint of the user. Additionally, in some examples, as shown in FIG. 4G, the electronic device 401 displays the visual indication 430 relative to the ground/surface of the city environment 440 in which the user is running/walking. For example, as shown in FIG. 4G, the electronic device 401 displays the visual indication 430 over the ground of the sidewalk/path on which the user is running, such that the visual indication 430 visually appears to be transposed on the ground (e.g., as if the visual indication 430 were a physical marker painted onto or etched into the ground). In this way, as discussed herein below, while the visual indication 430 is displayed, the field of view of the user remains open and unobstructed as similarly discussed above, which increases user visibility and helps avoid user distraction and/or obscuring of physical objects in the field of view.

In some examples, the electronic device 401 maintains placement of the visual indication 430 at the predetermined distance 431 as the user moves in the city environment 440. For example, from FIGS. 4G to 4H, the electronic device 401 detects movement of the user further along the sidewalk of the city environment 440 and toward path 445 (e.g., caused by the progression of the running and/or walking of the user). In some examples, as shown in FIG. 4H, though the electronic device 401 has moved forward in the city environment 440 in accordance with the movement of the user, the electronic device 401 maintains placement of the visual indication 430 at the predetermined distance 431 from the updated viewpoint of the user.

In some examples, the electronic device 401 changes a location at which the visual indication 430 is displayed in the three-dimensional environment 450 while still maintaining display of the visual indication 430 at the predetermined distance 431 from the updated viewpoint of the user. For example, as mentioned above, the visual indication 430 provides a visual cue of a path of motion for the user of the electronic device 401 (e.g., a predetermined path of motion based on data received from a respective application or a predicted path of motion based on the user's current environment, exercise activity, and/or behavioral trends).

Accordingly, in some examples, the electronic device 401 updates display of the visual indication 430 in accordance with a direction of the current movement of the user (e.g., the direction of the current movement of the electronic device 401). For example, as shown in top-down view 480 in FIG. 4I, the electronic device 401 optionally updates display of the visual indication 430 to be displayed at a different location in the three-dimensional environment 450 (e.g., pointing along and displayed over path 445 in the city environment 440) that is selected in accordance with the current and/or predicted movement of the user 408 of the electronic device 401.

As shown in FIG. 4I, a current and/or predicted path of motion of the user 408 is indicated by motion path 482 in the top-down view 480. As discussed above, the electronic device 401 optionally determines the motion path 482 within the three-dimensional environment 450 based on the current direction of motion of the user 408 and/or based on a predicted direction of motion of the user 408 (e.g., determined based on data provided by an application with which the visual indication is associated, such as a fitness application or navigation application). For example, in FIG. 4I, the positioning of visual indication 430*b* in the top-down view 480 indicates the location in the three-dimensional environment 450 at which the visual indication would be displayed if the placement location of the visual indication were not updated based on the direction of movement of the user 408. In some examples, the placement location of the visual indication 430*b* corresponds to the placement location of the visual indication 430 in FIG. 4H relative to the viewpoint of the user 408 (e.g., the predetermined distance 431 directly ahead of the current viewpoint of the user 408). Rather, as shown in the top-down view 480 in FIG. 4I, the electronic device 401 positions the visual indication 430*a* in the three-dimensional environment 450 to align with the path of motion 482 of the user 408. In some examples, as shown in FIG. 4I, though the visual indication 430*a* is displayed at a different location in the three-dimensional environment 450 (e.g., forward and to the left of the location of the visual indication 430*b*) and/or with a different orientation (e.g., pointing leftward in the three-dimensional environment 450 compared to the forward pointing orientation in FIG. 4H) from the current viewpoint of the user, the electronic device 401 maintains display of the visual indication 430 at the predetermined distance 431 from the current viewpoint of the user.

Figure 4J:
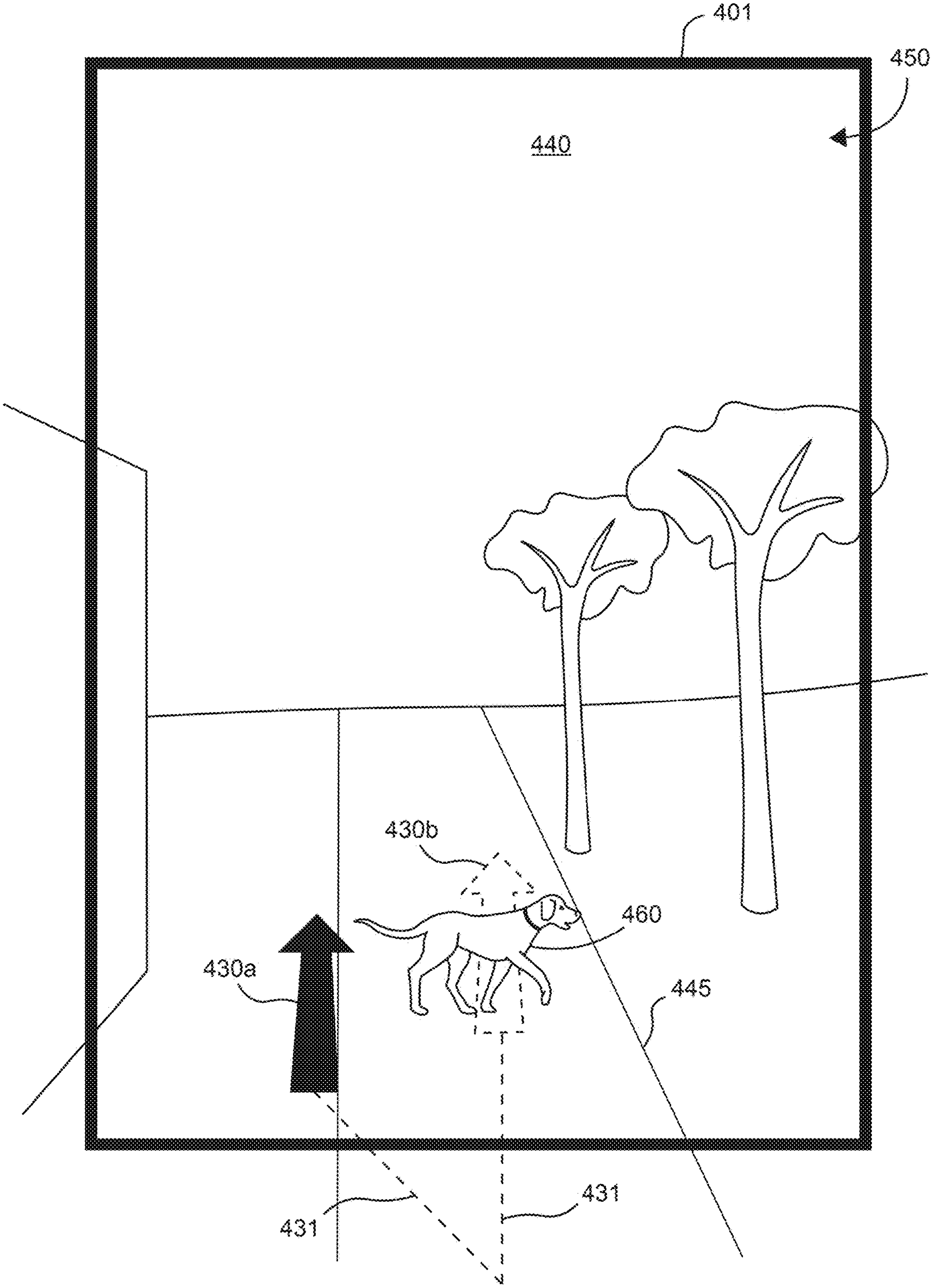

In some examples, the electronic device 401 selectively updates display of the visual indication 430 based on detection of physical objects in the field of view of the user with which the visual indication 430 could spatially conflict. For example, as shown in FIG. 4J, while the user is moving (e.g., running or walking) along the path 445 in the city environment 440, the electronic device 401 visually detects (e.g., via one or more cameras of the electronic device 401) a dog 460 that is positioned on the path 445. Particularly, as shown in FIG. 4J, the electronic device 401 determines that the dog 460 is currently located at a position in the three-dimensional environment 450 at which the visual indication is to be displayed (e.g., initial default location that is the predetermined distance 431 from the viewpoint of the user), represented by dashed visual indication 430*b*.

In some examples, to avoid displaying the visual indication at a location that overlaps with the dog 460, the electronic device 401 displays (e.g., moves) the visual indication 430*a* at a location in the three-dimensional environment 450 that does not overlap with the dog 460. For example, as shown in FIG. 4J, the electronic device 401 displays the visual indication 430*a* to the left of the dog 460 relative to the viewpoint of the user. Additionally, as shown in FIG. 4J and as similarly discussed above, the electronic device 401 displays the visual indication 430*a* at the predetermined distance from the viewpoint of the user in the three-dimensional environment 450.

Alternatively, in some examples, in accordance with a determination that the display of the visual indication at the location of the dog 460 would not significantly impact visibility of the dog 460 relative to the viewpoint of the user, the electronic device 401 proceeds with displaying the visual indication at the location of the dog 460 in the three-dimensional environment 450. For example, as shown in FIG. 4J, the electronic device 401 may display the visual indication 430*b* in the three-dimensional environment 450 despite the location of the visual indication 430*b* overlapping with the dog 460. Particularly, in some examples, because the visual indication 430*b* is displayed relative to the ground of the city environment 440 (e.g., such that to visually appear transposed on the ground of the path 445 from the viewpoint of the user), the visual indication 430*b* does not significantly overlap with the dog 460 (e.g., the dog 460 remains visible enough to the user as shown in FIG. 4J such that display of the visual indication 430*b* would not cause the user to potentially collide with the dog 460). Therefore, the electronic device 401 optionally displays the visual indication 430*b* at the location of the dog 460 in the three-dimensional environment 450. However, if an alternative type of object, such as a rock, pothole, crack, barrier, or other object, that is small enough and/or low enough to be substantially overlapped by the visual indication 430*b*, the electronic device 401 optionally displays the visual indication 430*a* to help reduce the likelihood of the user contacting and/or tripping on such an object.

It should be understood that, in some examples, additional and/or alternative user interfaces, such as first user interface 415 discussed above, may be displayed in a same or similar manner as the visual indication 430 described with reference to FIGS. 4G-J. Additionally, in some examples, such interfaces need not be displayed parallel to the ground of the physical environment 440 as discussed above (e.g., aligned to the ground plane of the three-dimensional environment 450). For example, the electronic device 401 may display the visual indication 430 as a floating virtual object (e.g., similar to first user interface 415) in front of the user in the three-dimensional environment 450 but the location and/or direction in which the visual indication 430 is displayed relative to the viewpoint of the user is based on the predicted path of motion, as discussed above.

It is understood that the examples shown and described herein are merely exemplary and that additional and/or alternative elements may be provided within the three-dimensional environment relating to the display and tracking of user exercise activities. It should be understood that the appearance, shape, form and size of each of the various user interface elements and objects shown and described herein are exemplary and that alternative appearances, shapes, forms and/or sizes may be provided. For example, the virtual objects representative of user interfaces and/or windows (e.g., user interface 315) may be provided in an alternative shape than a rectangular shape, such as a circular shape, triangular shape, etc. Additionally or alternatively, in some examples, the various user interface elements described herein may be selected and/or manipulated via user input received via one or more separate input devices in communication with the electronic device(s). For example, where applicable, selection input (e.g., for initiating tracking of the exercise activity) may be received via physical input devices, such as a mouse, trackpad, keyboard, etc. in communication with the electronic device(s).

Figure 5:
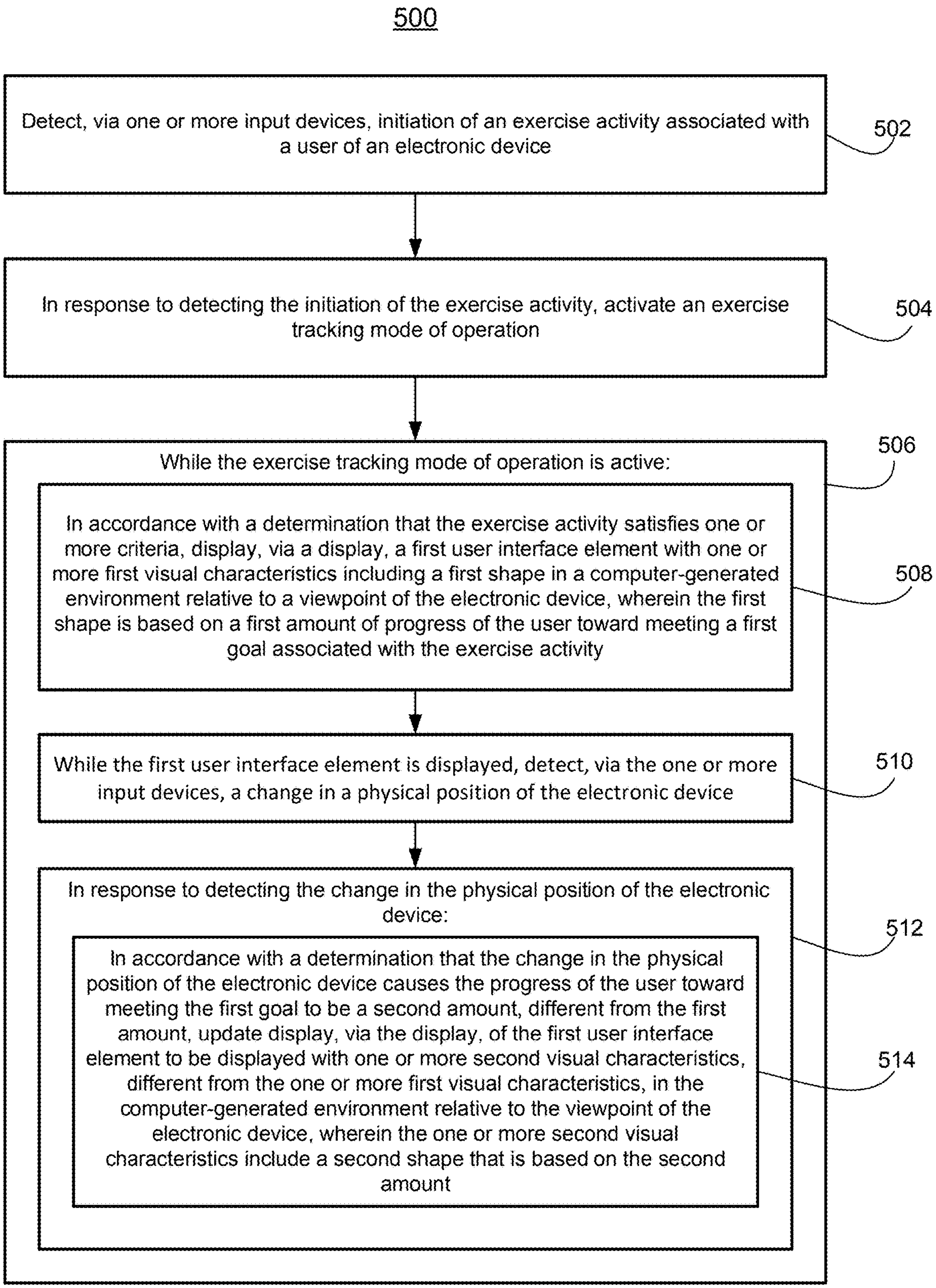
FIG. 5 is a flow diagram illustrating an example process for displaying one or more user interfaces associated with one or more goals of an exercise activity in a computer-generated environment according to some examples of the disclosure.

FIG. 5 is a flow diagram illustrating an example process for updating display of one or more user interfaces in a computer-generated environment according to some examples of the disclosure. In some examples, process 500 begins at an electronic device in communication with a display and one or more input devices. In some examples, the electronic device is optionally a head-mounted display similar or corresponding to device 201 of FIG. 2. As shown in FIG. 5, in some examples, at 502, the electronic device detects, via the one or more input devices, initiation of an exercise activity associated with a user of the electronic device. For example, as described with reference to FIG. 3B, the electronic device 301 detects movement of the electronic device caused by movement of the user that corresponds to a running or walking activity.

In some examples, at 504, in response to detecting the initiation of the exercise activity, the electronic device activates an exercise tracking mode of operation. In some examples, block 504 further includes displaying, via the display, a first exercise user interface associated with tracking the exercise activity in a computer-generated environment, wherein the first exercise user interface includes a first user interface element. For example, as shown in FIG. 3C, the electronic device 301 displays a first user interface 315 in three-dimensional environment 350 that includes one or more representations 305-1 through 305-5 of one or more fitness metrics (e.g., exercise duration, average detected heart rate, exercise distance, etc.) associated with the exercise activity.

In some examples, at 506, while the exercise tracking mode of operation is active, in accordance with a determination that the exercise activity satisfies one or more criteria, the electronic device displays, via the display, a first user interface element with one or more first visual characteristics including a first shape in a computer-generated environment relative to a viewpoint of the electronic device, wherein the first shape is based on a first amount of progress of the user toward meeting a first goal associated with the exercise activity. For example, as shown in FIG. 3D, the electronic device 301 displays first user interface element 320 having a first radius 321-1, having a first shape, and/or having a first thickness relative to the viewpoint of the user in the three-dimensional environment 350 and being associated with a first goal of the running activity (e.g., a distance-based goal).

In some examples, at 510, while the first user interface element is displayed, the electronic device detects, via the one or more input devices, a change in a physical position of the electronic device. For example, as shown in FIG. 3E, the electronic device 301 detects movement of the user in city environment 340 that causes movement of the electronic device 301. In some examples, at 512, in response to detecting the change in the physical position of the electronic device, at 514, in accordance with a determination that the change in the physical position of the electronic device causes the progress of the user toward meeting the first goal to be a second amount, different from the first amount, the electronic device updates display, via the display, of the first user interface element to be displayed with one or more second visual characteristics, different from the one or more first visual characteristics, in the computer-generated environment relative to the viewpoint of the electronic device, wherein the one or more second visual characteristics include a second shape that is based on the second amount. For example, as shown in FIG. 3E, the electronic device 301 determines that the movement of the electronic device 301 causes the user to progress further toward the first goal, represented by progress bar 330*b*, and updates display of the first user interface element 320 to have a second radius 321-2, which causes the shape of the first user interface element 320 to change relative to the viewpoint of the user.

It is understood that process 500 is an example and that more, fewer, or different operations can be performed in the same or in a different order. Additionally, the operations in process 500 described above are, optionally, implemented by running one or more functional modules in an information processing apparatus such as general-purpose processors (e.g., as described with respect to FIG. 2) or application specific chips, and/or by other components of FIG. 2.

Figure 6:
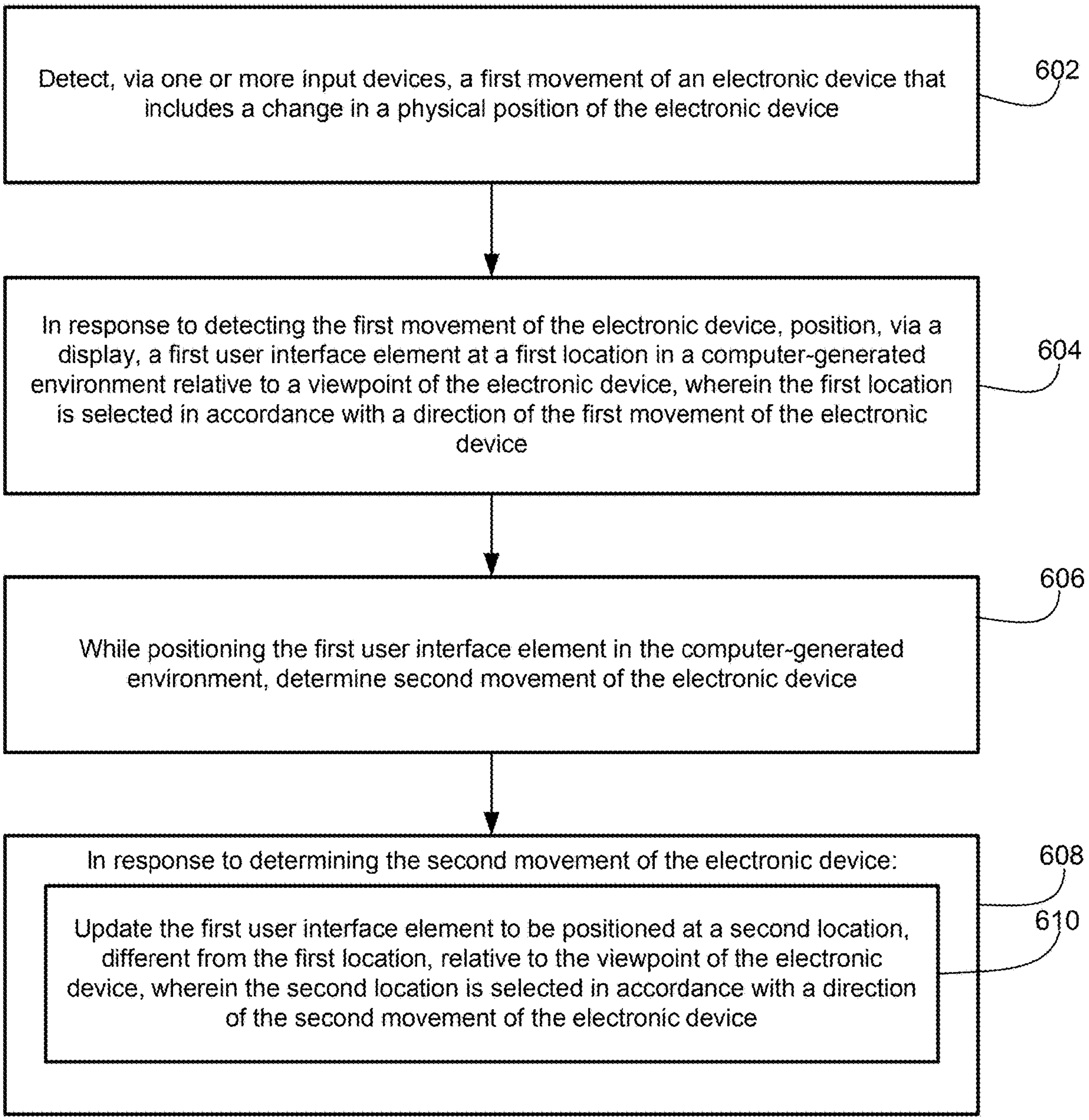
FIG. 6 is a flow diagram illustrating an example process for displaying one or more user interfaces based on movement of an electronic device in a computer-generated environment according to some examples of the disclosure.

FIG. 6 is a flow diagram illustrating an example process for displaying one or more user interfaces based on movement of an electronic device in a computer-generated environment according to some examples of the disclosure. In some examples, process 600 begins at an electronic device in communication with a display and one or more input devices. In some examples, the electronic device is optionally a head-mounted display similar or corresponding to device 201 of FIG. 2. As shown in FIG. 6, in some examples, at 602, the electronic device detects, via the one or more input devices, a first movement of the electronic device that includes a change in a physical position of the electronic device. For example, as described with reference to FIG. 4B, the electronic device 401 detects movement of the electronic device caused by movement of the user that corresponds to a running or walking activity.

In some examples, at 604, in response to detecting the first movement of the electronic device, the electronic device displays, via the display, a first user interface element at a first location in a computer-generated environment relative to a viewpoint of the electronic device, wherein the first location is selected in accordance with a direction of the first movement of the electronic device. For example, as shown in FIG. 4G, the electronic device 301 displays a visual indication 430 in three-dimensional environment 450 that provides an indication of a direction of motion of the user and that is displayed a predetermined distance 431 from the viewpoint of the user.

In some examples, at 606, while displaying the first user interface element in the computer-generated environment, the electronic device determines second movement of the electronic device. For example, as shown in FIG. 4I, the electronic device 401 detects movement of the user in city environment 440 that causes movement of the electronic device 401. In some examples, at 608, in response to determining the second movement of the electronic device, at 610, the electronic device updates the first user interface element to be displayed at a second location, different from the first location, relative to the viewpoint of the electronic device, wherein the second location is selected in accordance with a direction of the second movement of the electronic device. For example, as shown in the top-down view 480 in FIG. 4I, the electronic device 401 updates display of the location of the visual indication 430 in the three-dimensional environment 450 while maintaining display of the visual indication 430 to be the predetermined distance 431 from the viewpoint of the user.

It is understood that process 600 is an example and that more, fewer, or different operations can be performed in the same or in a different order. Additionally, the operations in process 600 described above are, optionally, implemented by running one or more functional modules in an information processing apparatus such as general-purpose processors (e.g., as described with respect to FIG. 2) or application specific chips, and/or by other components of FIG. 2.

Therefore, according to the above, some examples of the disclosure are directed to a method, comprising at an electronic device in communication with a display, and one or more input devices: detecting, via the one or more input devices, initiation of an exercise activity associated with a user of the electronic device; in response to detecting the initiation of the exercise activity, activating an exercise tracking mode of operation; and while the exercise tracking mode of operation is active: in accordance with a determination that the exercise activity satisfies one or more criteria, displaying, via the display, a first user interface element with one or more first visual characteristics including a first shape in a computer-generated environment relative to a viewpoint of the electronic device, wherein the first shape is based on a first amount of progress of the user toward meeting a first goal associated with the exercise activity; while the first user interface element is displayed, detecting, via the one or more input devices, a change in a physical position of the electronic device; and in response to detecting the change in the physical position of the electronic device, in accordance with a determination that the change in the physical position of the electronic device causes the progress of the user toward meeting the first goal to be a second amount, different from the first amount, updating display, via the display, of the first user interface element to be displayed with one or more second visual characteristics, different from the one or more first visual characteristics, in the computer-generated environment relative to the viewpoint of the electronic device, wherein the one or more second visual characteristics include a second shape that is based on the second amount.

Additionally or alternatively, in some examples, the first user interface element includes a virtual ring. Additionally or alternatively, in some examples, displaying the first user interface element with the one or more first visual characteristics includes displaying the virtual ring at a first location in the computer-generated environment based on a location of a portion of the user in the physical environment. Additionally or alternatively, in some examples, displaying the first user interface element with the one or more first visual characteristics includes displaying the virtual ring with a first radius relative to the viewpoint of the electronic device based on the first amount. Additionally or alternatively, in some examples, in accordance with a determination that the second amount is greater than the first amount, displaying the first user interface element with the one or more second visual characteristics includes displaying the virtual ring with a second radius, smaller than the first radius, relative to the viewpoint of the electronic device. Additionally or alternatively, in some examples, in accordance with a determination that the second amount is smaller than the first amount, displaying the first user interface element with the one or more second visual characteristics includes displaying the virtual ring with a second radius, larger than the first radius, relative to the viewpoint of the electronic device. Additionally or alternatively, in some examples, the first goal corresponds to a distance-based goal, while the virtual ring is displayed with the first radius, the viewpoint of the electronic device is a first distance from meeting the first goal, and in accordance with the determination that the change in the position of the electronic device causes the progress of the user toward meeting the first goal to be the second amount: the viewpoint of the electronic device is a second distance from meeting the first goal; in accordance with a determination that the second distance is smaller than the first distance by at least a first degree, the virtual ring is displayed with a second radius that is based on a first rate of change relative to a difference between the first amount and the second amount; and in accordance with a determination that the second distance is not smaller than the first distance by at least the first degree, the virtual ring is displayed with a third radius that is based on a second rate of change, different from the first rate of change, relative to the difference between the first amount and the second amount.

Additionally or alternatively, in some examples, displaying the first user interface element with the one or more first visual characteristics is independent of a direction of movement of the electronic device in the physical environment while the user is performing the exercise activity. Additionally or alternatively, in some examples, the one or more criteria include a criterion that is satisfied when the exercise activity causes the user to at least partially progress toward meeting the first goal. Additionally or alternatively, in some examples, the one or more criteria include a criterion that is satisfied when a detected status of the exercise activity is within a threshold amount of the first goal. Additionally or alternatively, in some examples, displaying the first user interface element with the one or more first visual characteristics includes displaying the first user interface element at a first elevation relative to a surface of the physical environment from the viewpoint of the electronic device. Additionally or alternatively, in some examples, the method further comprises: while the exercise tracking mode of operation is active, detecting, via the one or more input devices, a conclusion of the exercise activity; and in response to detecting the conclusion of the exercise activity, deactivating the exercise tracking mode of operation, including ceasing display of the first user interface element in the computer-generated environment. Additionally or alternatively, in some examples, displaying the first user interface element with the one or more first visual characteristics includes displaying the first user interface element at a first distance relative to the viewpoint of the electronic device in the computer-generated environment, and displaying the first user interface element with the one or more second visual characteristics includes displaying the first user interface element at a second distance, different from the first distance, relative to the viewpoint of the electronic device in the computer-generated environment.

Additionally or alternatively, in some example, the method further comprises: while the exercise tracking mode of operation is active, detecting a progression of the exercise activity that causes the user to meet the first goal; and in response to detecting the progression of the exercise activity, ceasing display of the first user interface element in the computer-generated environment. Additionally or alternatively, in some examples, the method further comprises, after ceasing display of the first user interface element, displaying, via the display, a second user interface element having one or more third visual characteristics based on a third amount of progress of the user toward meeting a second goal associated with the exercise activity. Additionally or alternatively, in some examples, the electronic device includes a head-mounted display. Additionally or alternatively, in some examples, the first goal corresponds to a first intermediate goal of a plurality of intermediate goals associated with the exercise activity. Additionally or alternatively, in some examples, displaying the first user interface element with the first shape includes displaying the first user interface element with a circular shape having a first radius.

Additionally or alternatively, in some examples, displaying the first user interface element with the second shape includes displaying the first user interface element with the circular shape having a second radius, smaller than the first radius. Additionally or alternatively, in some examples, the exercise activity includes a running activity. Additionally or alternatively, in some examples, the exercise activity includes a walking activity.

Some examples of the disclosure are directed to a method comprising at an electronic device in communication with a display, and one or more input devices: detecting, via the one or more input devices, a first movement of the electronic device that includes a change in a physical position of the electronic device; in response to detecting the first movement of the electronic device, positioning a first user interface element at a first location in a computer-generated environment relative to a viewpoint of the electronic device, wherein the first location is selected in accordance with a direction of the first movement of the electronic device; while positioning the first user interface element in the computer-generated environment, determining second movement of the electronic device; and in response to determining the second movement of the electronic device, updating the first user interface element to be positioned at a second location, different from the first location, relative to the viewpoint of the electronic device, wherein the second location is selected in accordance with a direction of the second movement of the electronic device.

Additionally or alternatively, in some examples, the first user interface element is positioned in accordance with a determination that the first movement satisfies one or more movement criteria. Additionally or alternatively, in some examples, determining the second movement of the electronic device includes detecting, via the one or more input devices, a change in the physical position of the electronic device in a physical environment. Additionally or alternatively, in some examples, determining the second movement of the electronic device includes generating a predicted path of motion of the user of the electronic device relative to a physical environment. Additionally or alternatively, in some examples, the first user interface element is positioned in accordance with a determination that the first movement corresponds to an exercise activity associated with the user of the electronic device. Additionally or alternatively, in some examples, the first user interface element includes one or more indications of one or more fitness metrics corresponding to the exercise activity. Additionally or alternatively, in some examples, the method further comprises, in response to determining the second movement of the electronic device, in accordance with a determination that the second movement causes the one or more fitness metrics corresponding to the exercise activity to be updated, updating the first user interface element to include one or more updated indications of one or more updated fitness metrics corresponding to the exercise activity. Additionally or alternatively, in some examples, the first user interface element is positioned in accordance with a determination that the first movement corresponds to a guided exercise activity associated with an exercise application running on the electronic device, and the first user interface element includes one or more first visual indications corresponding to the guided exercise activity. Additionally or alternatively, in some examples, the method further comprises, in response to determining the second movement of the electronic device, in accordance with a determination that the second movement produces a progression in the guided exercise activity by the user according to the one or more first visual indications, updating the first user interface element to include one or more second visual indications, different from the one or more first visual indications, corresponding to the guided exercise activity.

Additionally or alternatively, in some examples, the first location is a first distance from the viewpoint of the electronic device and the second location is a second distance from the viewpoint, and the first distance is equal to the second distance. Additionally or alternatively, in some examples, the first location is further selected to be spatially offset from a center of a field of view of the electronic device in the computer-generated environment. Additionally or alternatively, in some examples, the first location is further selected based on a predicted path of motion of the user of the electronic device relative to a physical environment based on the first movement. Additionally or alternatively, in some examples, the first location is further selected based on detecting a planar surface of a physical environment. Additionally or alternatively, in some examples, the method further comprises: while the first user interface element is positioned in the computer-generated environment, detecting, via the one or more input devices, a conclusion of movement of the electronic device; and in response to detecting the conclusion of the movement of the electronic device, in accordance with a determination that the conclusion of the movement of the electronic device satisfies one or more criteria, ceasing to display of the first user interface element in the computer-generated environment. Additionally or alternatively, in some examples, the first location is further selected in accordance with detecting one or more physical objects in a current field of view of the electronic device when the first movement is detected, and the first location is different from one or more locations of the detected one or more physical objects. Additionally or alternatively, in some examples, the first user interface element is positioned in accordance with a determination that the first movement includes a change in the physical position of the electronic device that is greater than a threshold amount of change.

Additionally or alternatively, in some examples, the first location is further selected to be outside of a current field of view of the electronic device when the first movement is detected. Additionally or alternatively, in some examples, the first movement of the electronic device corresponds to a running activity associated with the user of the electronic device. Additionally or alternatively, in some examples, the first movement of the electronic device corresponds to a walking activity associated with the user of the electronic device. Additionally or alternatively, in some examples, the electronic device includes a head-mounted display.

Some examples of the disclosure are directed to an electronic device, comprising: one or more processors; memory; and one or more programs stored in the memory and configured to be executed by the one or more processors, the one or more programs including instructions for performing any of the above methods.

Some examples of the disclosure are directed to a non-transitory computer readable storage medium storing one or more programs, the one or more programs comprising instructions, which when executed by one or more processors of an electronic device, cause the electronic device to perform any of the above methods.

Some examples of the disclosure are directed to an electronic device, comprising one or more processors, memory, and means for performing any of the above methods.

Some examples of the disclosure are directed to an information processing apparatus for use in an electronic device, the information processing apparatus comprising means for performing any of the above methods.

The foregoing description, for purpose of explanation, has been described with reference to specific examples. However, the illustrative discussions above are not intended to be exhaustive or to limit the disclosure to the precise forms disclosed. Many modifications and variations are possible in view of the above teachings. The examples were chosen and described in order to best explain the principles of the disclosure and its practical applications, to thereby enable others skilled in the art to best use the disclosure and various described examples with various modifications as are suited to the particular use contemplated.

What is claimed is:

1. A method comprising:

at an electronic device in communication with a display, and one or more input devices:

displaying a first user interface element at a first location in a three-dimensional environment corresponding to a center of field of view of a user;

detecting, via the one or more input devices, a first movement of the electronic device that includes a change in a physical position of the electronic device, the first movement indicative of locomotive movement of a user of the electronic device;

in response to detecting the first movement of the electronic device, positioning a first user interface element at a second location, different from the first location, in the three-dimensional environment relative to a viewpoint of the user, wherein the second location is selected, in accordance with a direction of the first movement of the electronic device, to be spatially offset from the center of the field of view of the user or to be outside of a current field of view of the user device when the first movement is detected;

while positioning the first user interface element in the three-dimensional environment, determining second movement of the electronic device including a rotational movement of the electronic device; and in response to determining the second movement of the electronic device:

updating the first user interface element to be positioned at a third location, different from the second location, relative to the viewpoint of the user, wherein the third location is selected in accordance with a direction of the second movement of the electronic device.

2. The method of claim 1, wherein determining the second movement of the electronic device includes generating a predicted path of motion of the user of the electronic device relative to a physical environment.

3. The method of claim 1, wherein the first user interface element is positioned in accordance with a determination that the first movement corresponds to an exercise activity associated with the user of the electronic device.

4. The method of claim 1, wherein:

the first user interface element is positioned in accordance with a determination that the first movement corresponds to a guided exercise activity associated with an exercise application running on the electronic device; and the first user interface element includes one or more first visual indications corresponding to the guided exercise activity.

5. The method of claim 1, wherein:

the second location is a first distance from the viewpoint of the electronic device and the third location is a second distance from the viewpoint; and first distance is equal to the second distance.

6. The method of claim 1, wherein the second location is further selected based on a predicted path of motion of the user of the electronic device relative to a physical environment based on the first movement.

7. The method of claim 1, wherein:

the second location is further selected in accordance with detecting one or more physical objects in a current field of view of the electronic device when the first movement is detected; and the second location is different from one or more locations of the detected one or more physical objects.

8. The method of claim 1, further comprising:

while the first user interface element is positioned in the three-dimensional environment, detecting, via the one or more input devices, a conclusion of movement of the electronic device; and in response to detecting the conclusion of the movement of the electronic device:

in accordance with a determination that the conclusion of the movement of the electronic device satisfies one or more criteria, ceasing to display of the first user interface element in the three-dimensional environment.

9. An electronic device comprising:

one or more processors;

memory; and one or more programs stored in the memory and configured to be executed by the one or more processors, the one or more programs including instructions for performing a method comprising:

displaying a first user interface element at a first location in a three-dimensional environment corresponding to a center of field of view of a user;

detecting, via one or more input devices, a first movement of the electronic device that includes a change in a physical position of the electronic device, the first movement indicative of locomotive movement of a user of the electronic device;

in response to detecting the first movement of the electronic device, positioning a first user interface element at a second location, different from the first location, in the three-dimensional environment relative to a viewpoint of the user, wherein the second location is selected, in accordance with a direction of the first movement of the electronic device, to be spatially offset from the center of the field of view of the user device or to be outside of a current field of view of the user when the first movement is detected;

while positioning the first user interface element in the three-dimensional environment, determining second movement of the electronic device including a rotational movement of the electronic device; and in response to determining the second movement of the electronic device:

updating the first user interface element to be positioned at a third location, different from the second location, relative to the viewpoint of the user, wherein the third location is selected in accordance with a direction of the second movement of the electronic device.

10. The electronic device of claim 9, wherein determining the second movement of the electronic device includes generating a predicted path of motion of the user of the electronic device relative to a physical environment.

11. The electronic device of claim 9, wherein the first user interface element is positioned in accordance with a determination that the first movement corresponds to an exercise activity associated with the user of the electronic device.

12. The electronic device of claim 9, wherein:

the first user interface element is positioned in accordance with a determination that the first movement corresponds to a guided exercise activity associated with an exercise application running on the electronic device; and the first user interface element includes one or more first visual indications corresponding to the guided exercise activity.

13. The electronic device of claim 9, wherein:

the second location is a first distance from the viewpoint of the electronic device and the third location is a second distance from the viewpoint; and first distance is equal to the second distance.

14. The electronic device of claim 9, wherein the second location is further selected based on a predicted path of motion of the user of the electronic device relative to a physical environment based on the first movement.

15. The electronic device of claim 9, wherein:

the second location is further selected in accordance with detecting one or more physical objects in a current field of view of the electronic device when the first movement is detected; and the second location is different from one or more locations of the detected one or more physical objects.

16. The electronic device of claim 9, wherein the one or more programs further include instructions for:

while the first user interface element is positioned in the three-dimensional environment, detecting, via the one or more input devices, a conclusion of movement of the electronic device; and in response to detecting the conclusion of the movement of the electronic device:

in accordance with a determination that the conclusion of the movement of the electronic device satisfies one or more criteria, ceasing to display of the first user interface element in the three-dimensional environment.

17. A non-transitory computer readable storage medium storing one or more programs, the one or more programs comprising instructions, which when executed by one or more processors of an electronic device, cause the electronic device to perform a method comprising:

displaying a first user interface element at a first location in a three-dimensional environment corresponding to a center of field of view of a user;

detecting, via one or more input devices, a first movement of the electronic device that includes a change in a physical position of the electronic device, the first movement indicative of locomotive movement of a user of the electronic device;

in response to detecting the first movement of the electronic device, positioning a first user interface element at a second location, different from the first location, in the three-dimensional environment relative to a viewpoint of the user, wherein the second location is selected, in accordance with a direction of the first movement of the electronic device, to be spatially offset from the center of the field of view of the user or to be outside of a current field of view of the user when the first movement is detected;

while positioning the first user interface element in the three-dimensional environment, determining second movement of the electronic device including a rotational movement of the electronic device; and in response to determining the second movement of the electronic device:

updating the first user interface element to be positioned at a third, different from the second location, relative to the viewpoint of the user, wherein the third location is selected in accordance with a direction of the second movement of the electronic device.

18. The non-transitory computer readable storage medium of claim 17, wherein determining the second movement of the electronic device includes generating a predicted path of motion of the user of the electronic device relative to a physical environment.

19. The non-transitory computer readable storage medium of claim 17, wherein the first user interface element is positioned in accordance with a determination that the first movement corresponds to an exercise activity associated with the user of the electronic device.

20. The non-transitory computer readable storage medium of claim 17, wherein:

the first user interface element is positioned in accordance with a determination that the first movement corresponds to a guided exercise activity associated with an exercise application running on the electronic device; and the first user interface element includes one or more first visual indications corresponding to the guided exercise activity.

21. The non-transitory computer readable storage medium of claim 17, wherein:

the second location is a first distance from the viewpoint of the electronic device and the third location is a second distance from the viewpoint; and first distance is equal to the second distance.

22. The non-transitory computer readable storage medium of claim 17, wherein the second location is further selected based on a predicted path of motion of the user of the electronic device relative to a physical environment based on the first movement.

23. The non-transitory computer readable storage medium of claim 17, wherein:

the second location is further selected in accordance with detecting one or more physical objects in a current field of view of the electronic device when the first movement is detected; and the second location is different from one or more locations of the detected one or more physical objects.

24. The non-transitory computer readable storage medium of claim 17, wherein the one or more programs further include instructions for:

while the first user interface element is positioned in the three-dimensional environment, detecting, via the one or more input devices, a conclusion of movement of the electronic device; and in response to detecting the conclusion of the movement of the electronic device:

in accordance with a determination that the conclusion of the movement of the electronic device satisfies one or more criteria, ceasing to display of the first user interface element in the three-dimensional environment.

* * * * *